United States Patent
McClements, IV

(10) Patent No.: US 9,189,818 B2
(45) Date of Patent: Nov. 17, 2015

(54) ASSOCIATION OF COMMENTS WITH SCREEN LOCATIONS DURING MEDIA CONTENT PLAYBACK

(75) Inventor: James Burns McClements, IV, Boulder, CO (US)

(73) Assignee: Quib, Inc., Boulder, CO (US)

( * ) Notice: Subject to any disclaimer, the term of this patent is extended or adjusted under 35 U.S.C. 154(b) by 0 days.

(21) Appl. No.: 13/323,619

(22) Filed: Dec. 12, 2011

(65) Prior Publication Data

US 2012/0151347 A1    Jun. 14, 2012

Related U.S. Application Data

(60) Provisional application No. 61/421,945, filed on Dec. 10, 2010, provisional application No. 61/432,395, filed on Jan. 13, 2011, provisional application No. 61/432,397, filed on Jan. 13, 2011, provisional application No. 61/439,189, filed on Feb. 3, 2011, provisional application No. 61/439,196, filed on Feb. 3, 2011.

(51) Int. Cl.
| | | |
|---|---|---|
| G06F 3/01 | (2006.01) | |
| G11B 27/034 | (2006.01) | |
| G11B 27/34 | (2006.01) | |
| G06Q 50/00 | (2012.01) | |
| G06Q 10/10 | (2012.01) | |
| G06Q 30/06 | (2012.01) | |
| G06F 3/0484 | (2013.01) | |
| H04N 21/4722 | (2011.01) | |
| G06F 17/24 | (2006.01) | |

(52) U.S. Cl.
CPC .............. *G06Q 50/01* (2013.01); *G06Q 10/101* (2013.01); *G06Q 30/0643* (2013.01); *G11B 27/034* (2013.01); *G11B 27/34* (2013.01); *G06F 3/0484* (2013.01); *G06F 17/241* (2013.01); *H04N 21/4722* (2013.01)

(58) Field of Classification Search
USPC .......................................... 715/716, 719, 751
See application file for complete search history.

(56) References Cited

U.S. PATENT DOCUMENTS

| | | | |
|---|---|---|---|
| 6,865,713 B1 * | 3/2005 | Bates et al. .................... | 715/233 |
| 6,931,151 B2 | 8/2005 | Weast | |
| 7,162,690 B2 | 1/2007 | Gupta et al. | |
| 7,735,101 B2 | 6/2010 | Lanza et al. | |
| 7,949,118 B1 | 5/2011 | Edamadaka et al. | |
| 8,806,320 B1 | 8/2014 | Abdo | |
| 2006/0200662 A1 * | 9/2006 | Fulton et al. .................. | 713/164 |
| 2007/0234194 A1 | 10/2007 | Tsuchiya et al. | |
| 2007/0245243 A1 | 10/2007 | Lanza et al. | |

(Continued)

*Primary Examiner* — Boris Pesin
*Assistant Examiner* — Elizabeth G Wright
(74) *Attorney, Agent, or Firm* — Holland & Hart LLP

(57) ABSTRACT

Methods, systems, and devices are described for associating comments with playback of media content. In these methods, systems, and devices, a selection of a screen location during the playback of the media content may be received from a user at an input device. A comment associated with the media content may also be received. The comment may be associated with the selected screen location at the input device. A data store may store the association of the selected screen location with the comment. A playback device may receive the comment and the associated screen location from a data store, monitor the playback of the media content to identify a point during the playback of the media content that is associated with the comment, and display an indication that the comment is associated with the screen location at the point during the playback that is associated with the comment.

19 Claims, 19 Drawing Sheets

(56) References Cited

U.S. PATENT DOCUMENTS

| | | |
|---|---|---|
| 2008/0010601 A1* | 1/2008 | Dachs .......................... 715/751 |
| 2008/0177752 A1 | 7/2008 | Kulkarni et al. |
| 2009/0007200 A1 | 1/2009 | Amento et al. |
| 2009/0187825 A1 | 7/2009 | Sandquist et al. |
| 2009/0210779 A1 | 8/2009 | Badoiu et al. |
| 2010/0100904 A1 | 4/2010 | Kawakami et al. |
| 2010/0199182 A1 | 8/2010 | Lanza et al. |
| 2010/0325560 A1 | 12/2010 | Bryan |
| 2012/0150698 A1 | 6/2012 | McClements, IV |
| 2012/0150997 A1 | 6/2012 | McClements, IV |
| 2012/0151320 A1 | 6/2012 | McClements, IV |
| 2012/0151345 A1 | 6/2012 | McClements, IV |
| 2012/0151346 A1 | 6/2012 | McClements, IV |

* cited by examiner

ASSOCIATION OF COMMENTS WITH SCREEN LOCATIONS DURING MEDIA CONTENT PLAYBACK

CROSS REFERENCES

The present application claims priority to the following patent applications: U.S. Provisional Patent Application No. 61/421,945, filed Dec. 10, 2010, entitled "DYNAMIC MULTIMEDIA COMMENT AND DISPLAY ARCHITECTURE"; U.S. Provisional Patent Application No. 61/432,395, filed Jan. 13, 2011, entitled "SYSTEM, DEVICE, AND INTERFACE ARCHITECTURE FOR COMMENT CREATION"; U.S. Provisional Patent Application No. 61/432,397, filed Jan. 13, 2011, entitled "SCREEN LOCATION COMMENT ARCHITECTURE"; U.S. Provisional Patent Application No. 61/439,189, filed Feb. 3, 2011, entitled "USER SELECTABLE COMMENT FILTER AND RELATED ARCHITECTURE"; and U.S. Provisional Patent Application No. 61/439,196, filed Feb. 3, 2011, entitled "COMMENT DELIVERY ARCHITECTURE," each of which is incorporated by reference in its entirety for all purposes.

The present application is further related to U.S. patent application Ser. No. 13/323,610, filed concurrently herewith, entitled "ASSOCIATING COMMENTS WITH PLAYBACK OF MEDIA CONTENT"; U.S. patent application Ser. No. 13/323,614, filed concurrently herewith, entitled "RECOGNITION LOOKUPS FOR SYNCHRONIZATION OF MEDIA PLAYBACK WITH COMMENT CREATION AND DELIVERY"; U.S. patent application Ser. No. 13/323,615, filed concurrently herewith, entitled "PARALLEL ECHO VERSION OF MEDIA CONTENT FOR COMMENT CREATION AND DELIVERY'; U.S. patent application Ser. No. 13/323,624, filed concurrently herewith, entitled "MEDIA CONTENT CLIP IDENTIFICATION AND COMBINATION ARCHITECTURE"; and U.S. patent application Ser. No. 13/323,622, filed concurrently herewith, entitled "COMMENT DELIVERY AND FILTERING ARCHITECTURE"; each of which is incorporated herein in its entirety for all purposes.

BACKGROUND

The present invention relates to the creation, storage, and distribution of commentary on media content.

Most people interact quite regularly with recorded media content, such as videos, music, books, and the spoken word. Modern society leans heavily on recorded media content to provide both entertainment and education. With the recent proliferation of portable media players, smartphones, tablet computers and the like, the demand for recorded media content continues to increase.

For many people, social interaction enhances the experience of viewing or listening to recorded media content. For example, the reactions and opinions of one's peers with respect to a certain film may increase that person's enjoyment of the film. In other examples, the perspective of a filmmaker or critic with a unique understanding of a particular film may, when shared, add greater meaning to one's perception of the film.

Often, a person consuming recorded media content may wish to share comments with other consumers of the recorded media content at present or in the future. Additionally, it may be desirable to incorporate comments generated by others with regard to specific portions of recorded media content into the experience of viewing and/or listening to the media content.

SUMMARY

Methods, systems, and devices are described for associating comments with playback of media content. In these methods, systems, and devices, a selection of a screen location during the playback of the media content may be received from a user at an input device. A comment associated with the media content may also be received. The comment may be associated with the selected screen location at the input device. A data store may store the association of the selected screen location with the comment. A playback device may receive the comment and the associated screen location from a data store, monitor the playback of the media content to identify a point during the playback of the media content that is associated with the comment, and display an indication that the comment is associated with the screen location at the point during the playback that is associated with the comment.

In a first set of embodiments, a method of associating comments with playback of media content includes: receiving from a user at an input device a selection of a screen location during the playback of the media content, receiving from the user at the input device a comment associated with the media content, and associating the comment with the selected screen location.

In a second set of embodiments, an apparatus for associating comments with playback of media content includes: a selection module configured to receive from a user a selection of a screen location during the playback of the media content, a comment receiving module configured to receive from the user a comment associated with the media content, and an association module configured to associate the comment with the selected screen location.

In a third set of embodiments, a method of associating comments with playback of media content includes: receiving a selection of a screen location associated with the playback of the media content and a comment associated with the screen location from a user input device over a network, and associating the comment with the screen location in a data store of stored comments associated with the media content.

In a fourth set of embodiments, a method of providing comments during playback of media content includes: receiving a comment associated with a screen location in the media content from a data store of comments associated with the media content, monitoring the playback of the media content to identify a point during the playback of the media content that is associated with the comment; and displaying an indication that the comment is associated with the screen location at the point during the playback of the media content that is associated with the comment.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Methods, systems, and devices are described for associating comments with playback of media content. In these methods, systems and devices, a selection of a screen location during the playback of the media content may be received from a user at an input device. A comment associated with the media content may also be received. The comment may be associated with the selected screen location at the input device. A data store may store the association of the selected screen location with the comment. A playback device may receive the comment and the associated screen location from a data store, monitor the playback of the media content to identify a point during the playback of the media content that is associated with the comment, and display an indication that the comment is associated with the screen location at the point during the playback that is associated with the comment This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

Figure 1:
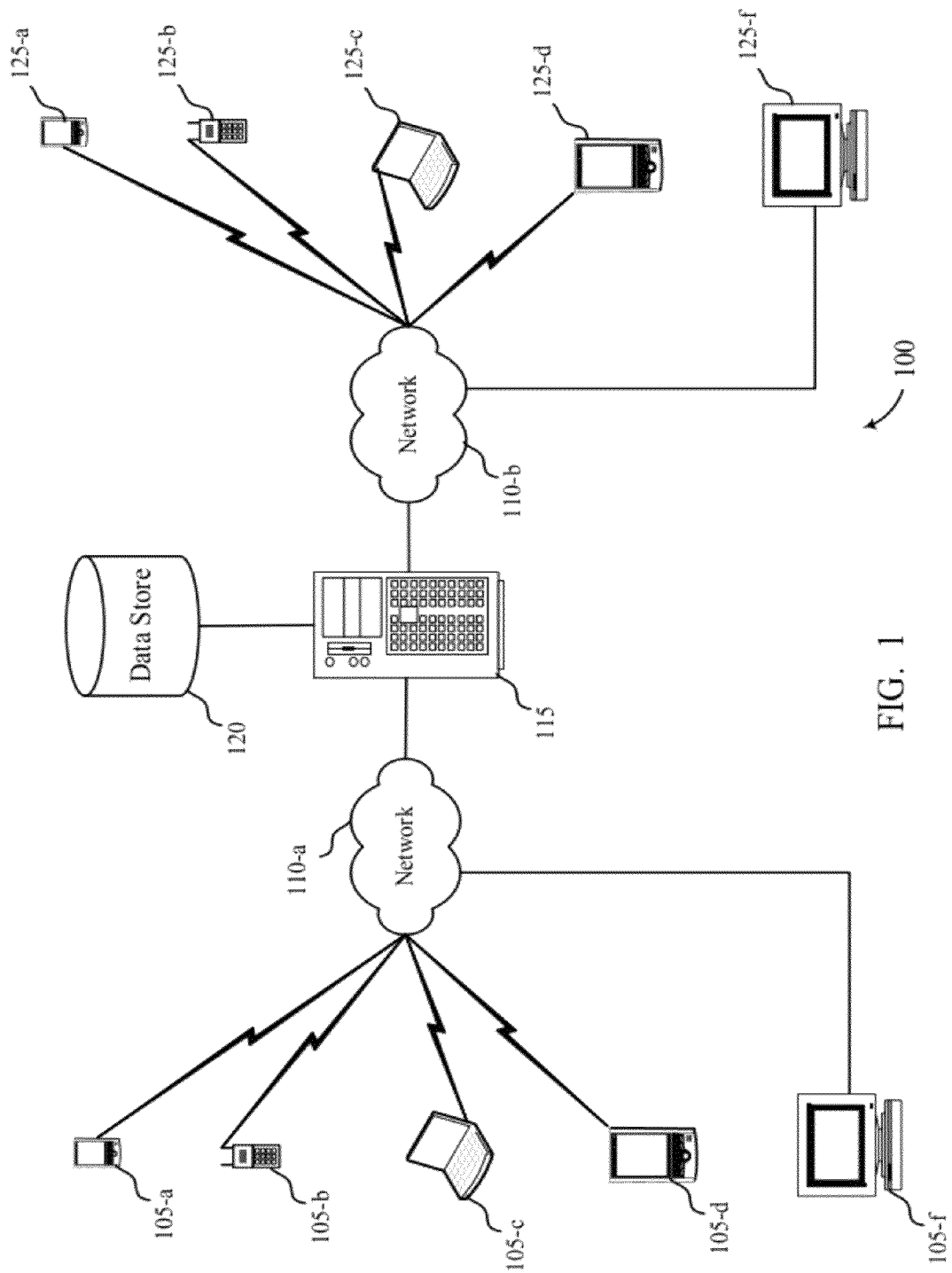
FIG. 1 is a block diagram of a system including components configured according to various embodiments of the invention.

Systems, devices, methods, and software are described for the creation of commentary on multimedia and other information content. In one set of embodiments, shown in FIG. 1, a system 100 includes input devices 105 (e.g., mobile device 105-a, mobile phone 105-b, laptop 105-c, tablet 105-d, computer 105-e, or other computing devices), networks 110, central server computer system 115, data store 120, and output devices 125 (e.g., mobile device 125-a, mobile phone 125-b, laptop 125-c, tablet 125-d, computer 125-e, or other computing devices). Each of these components may be in communication with each other, directly or indirectly.

Time, screen, and object location-specific comments may be created for multimedia and other information content. A user interface of an input device 105 allows a commentator to generate a comment, associated with a time code, for example, relating to the content (which, for purposes of this disclosure, may include movie, TV show, Internet and other video, book, article, song or other audio recording, photograph or other image, commercial advertisement, video game, immersive media, augmented or artificial reality media, the content contained in a comment, or other displayed content). The commentator may identify a screen location with the comment. The screen location may be modified or further defined as necessary to allow it to register a location within a 3D viewing environment. This created comment and associated screen location may be viewable to others watching the content in real time, or on a delayed basis. By using a time code, modified time code, or other locator or combination of locators as an external reference, along with a screen location, the comment need not actually be inserted into the multimedia, but may be called up from remote servers as the user reaches the applicable point. The comment may include text, video, audio, photographs and other images, graphical overlays, animations, musical notations, geographic coordinates, discussion threads, external and internal links and associations with media, meta-media or other comments, software applications and applets, special notations to set and grant permissions and define system behaviors or any combination thereof.

The comment may be stored locally (at the device 105, set-top box, or other storage device), or may be transmitted to the central server computer system 115 for cataloging and storage in data store 120. The central server computer system 115 may be made up of one or more server computers, workstations, web servers, or other suitable computing devices. The central server computer system 115 may be a cable or satellite headend. The central server computer system 115 may be fully located within a single facility or distributed geographically, in which case a network may be used to integrate different components.

Data store 120 may be a single database, or may be made up of any number of separate and distinct databases. The data store 120 may include one, or more, relational databases or components of relational databases (e.g., tables), object databases, or components of object databases, spreadsheets, text files, internal software lists, or any other type of data structure suitable for storing data. Thus, it should be appreciated that a data store 120 may each be multiple data storages (of the same or different type), or may share a common data storage with other data stores. Although in some embodiments the data store 120 may be distinct from a central server computer system 115, in other embodiments it may be integrated therein to varying degrees. The created commentary may be integrated into the underlying multimedia or other information content, or may be stand-alone content to be leveraged with technology allowing the time stamps to sync with the content as it is played.

The user may be alerted to the existence of a comment during playback of the content by the appearance of a viewing pane or a screen location or screen area-specific icon that can be touched or clicked on output device 125, to reveal its contents. In other examples, the content and commentary may be separated. Users may tailor their experience by selecting certain commentators, types of commentators, types of comments, and/or screen locations.

The components of the system 100 may be directly connected, or may be connected via a network 110 which may be any combination of the following: the Internet, an IP network, an intranet, a wide-area network ("WAN"), a local-area network ("LAN"), a virtual private network ("VPN"), the Public Switched Telephone Network ("PSTN"), or any other type of network supporting data communication between devices described herein, in different embodiments. A network may include both wired and wireless connections, including optical links. Many other examples are possible and apparent to those skilled in the art in light of this disclosure. In the discussion herein, a network may or may not be noted specifically. If no specific means of connection is noted, it may be assumed that the link, communication, or other connection between devices may be via a network.

The following description describes various aspects and options for the system. In the discussion below, the comments may be referred to as comments. Comments, as used herein, are to be interpreted very broadly. Comments may be created, and associated with screen locations, by users using input devices 105. Comments, and associated screen locations, may be viewed and controlled by users using output device 125. An input device 105 may be an output device 125, as well. Comments may be stored and organized in data store 120. Each feature is set forth for purposes of example only, and may be included or excluded in various embodiments.

A variety of interfaces may be used for comment creation. A commentator may use these interfaces to input a comment into a movie or other media item and to have that comment viewable (if the comment is marked public) to anyone else viewing or experiencing the media. By using a modified time code and screen location as an external reference, the comment may not actually be inserted into the media or into any metadata, but may be called up from a remote server as a viewer reaches that point in the media. There may be an uninterrupted feed by anticipating and pre-loading any upcoming comments. The user may be alerted to the existence of a comment during media playback by the appearance of a comment icon on the screen that can be touched or clicked to reveal its contents.

There are a variety of grid- or coordinate-based architectures that may be employed for screen location input and viewing. Alternatively, objects or images may be selected within an image. A variety of techniques are known in the art to select objects in an image based on color, brightness, and/or deviations. Shrink or expand controls may be used for object selection, as well. Within both 2D and 3D environments objects may be selected using techniques that may, for example, allow a user to select and associate a comment with a figure that is blocked by another object at the desired moment of comment insertion. This could be handled, for example, via a system that allowed the user to scrub forward or back, select the figure, and return to the desired comment insertion point. In 3D environments, a comment location may be defined by elements particular to the 3D environment, such as a view pane within the image that is a certain apparent distance from the camera, or a region associated with a specific depth of field. A comment location may be similarly defined in 2D and 3D light field photography and video, and in such examples comment delivery may be based on a user's access to certain fields of view or focus. A comment location may be defined in non-visual media such as music by way of visualizations that may, for example, allow a comment to be placed in a particular tonal area or in an area representing a particular instrument. For playback, a variety of techniques may be used to indicate that comments are in a specific location. An icon may be shown for each comment, or an icon can be shown with different transparencies to illustrate the number of comments. Objects may be controlled to glow, shimmer, or have different color features when comments are made. Objects not currently in view because they are blocked may be estimated or interpolated to show their approximate location and allow them to indicate their relevance to an associated comment. Users may control this so they can set the noise level for given content.

Figure 2:
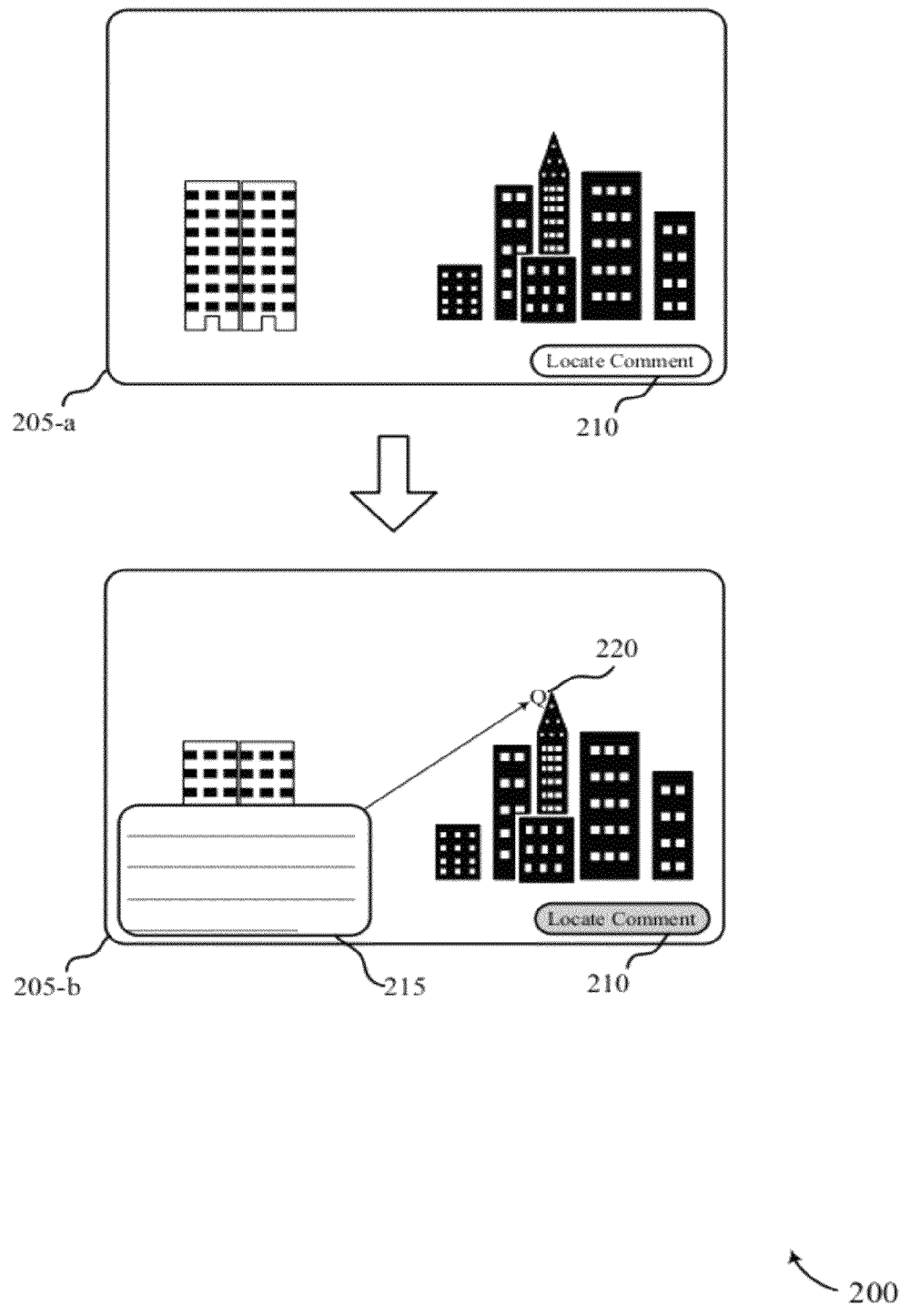
FIG. 2 is a block diagram of an example display according to various embodiments of the invention.

Thus, in one embodiment, there may simply be a time marker, screen location indicator, and associated text for a given piece of content. This may be stored separately and independently from the underlying content. FIG. 2 illustrates an example block diagram 200 of a display 205 with an interface for making comments. The display 205 may be on, or integrated with, a mobile device, mobile phone, laptop, tablet, computer, television, head-mounted display, remote control, or any number of other computing or viewing devices. The display 205 may be a touch screen or be controlled by user inputs into a remote, peripheral, or other mobile device. In the illustrated display 205, the locate comment icon 210 is overlaid on the content. However, in other embodiments, the interface may be independent or on another screen or window from the content.

Display 205-a illustrates the interface at Time1, with a locate comment icon 210. A user may click on, or otherwise select, the locate comment icon 210. Display 205-b illustrates the interface at Time2. A comment entry window 215 appears in response to the selection of the comment icon to allow the user to comment via text entry. A location indicator 220 (here marked by a "Q") shows the screen location that will be associated with the comment. The location may be selected by the user.

A user may set a screen indicator icon to display for a preset, or configurable, period. A user may set in and out points so that an entire scene can be referenced by the comment. This may allow the user to 'capture' the scene completely for reference and for playback or sharing. The user may set the icon to display at the beginning and end point, and to, optionally, display a scene marker during the span of the scene. This scene marker may be distinguishable from the standard comment marker.

As noted, comments are not limited to text, but may include text, video, audio, photographs and other images, graphical overlays, animations, musical notations, geographic coordinates, discussion threads, external and internal links and associations with media, meta-media or other comments, software applications and applets, special notations to set and grant permissions and define system behaviors or any combination thereof. Comments may be made by speaking, and the comment may be replayed during play of the underlying content. Alternatively, there may be speech to text conversion for making comments, and text to speech conversion for listening to comments. A user may insert a video of himself or herself with speech commentary, or other video may be inserted. Comments may be placed in specific locations on the display 205.

Comments from a number of users may be linked or otherwise integrated to create a comment set. A user may insert video, graphical, or audio overlays designed to be used simultaneously with media content rather than in separate or separable panes so that the media is augmented or fully joined by the message content. Comments may contain software applications that allow or trigger various actions within local or remote devices, software systems, or devices and systems within and outside the control of the user or the company or entity delivering these services. In this way, a comment can control local devices, for example, to reduce volume in one viewing pane or pause or slow the media, or provide other services to the user or other entities. Comments may be used, for example, to control or administer micropayment systems for media or premium commentary. Comments may contain a hyperlink to points outside the comment systems and they also may contain a link to or an association with a comment within the comment system or they may contain several potential links offering user a choice of links to media, media subunits and other comments in the form of a question, quiz, survey, or other device such as a software player that can link the comments and play the resulting media and meta-media. Comments and link-containing comments may be daisy chained, or linked in a hub-and-spoke or other such arrangement to provide unique ways for users to move through media or through portions of media.

Comments may be inserted as header comments designed to appear to subsequent users in a viewing pane associated with a point at the very beginning of the media and to contain general commentary about a piece of media not tied to a particular point on a timeline. Comments may contain messaging devices to allow the user, automatically or not, to send a message directly to another user or entity. Comments may include a device to exclude any user response from the public commentary or message stream so that it is viewable only as a private comment or message. Comments may have special status and functionality as super comments that allow individuals and entities, for example a wiki service, to capture and distill various comments in a single comment or an ordered collection of comments, which can then be further vetted and augmented. These super comments also may be filterable into collections of commentary that match a user's interests and sensibilities. Various comment types and combinations may be clearly marked with symbols, colors or other methods to alert users to their capabilities and limitations.

Figure 3A:
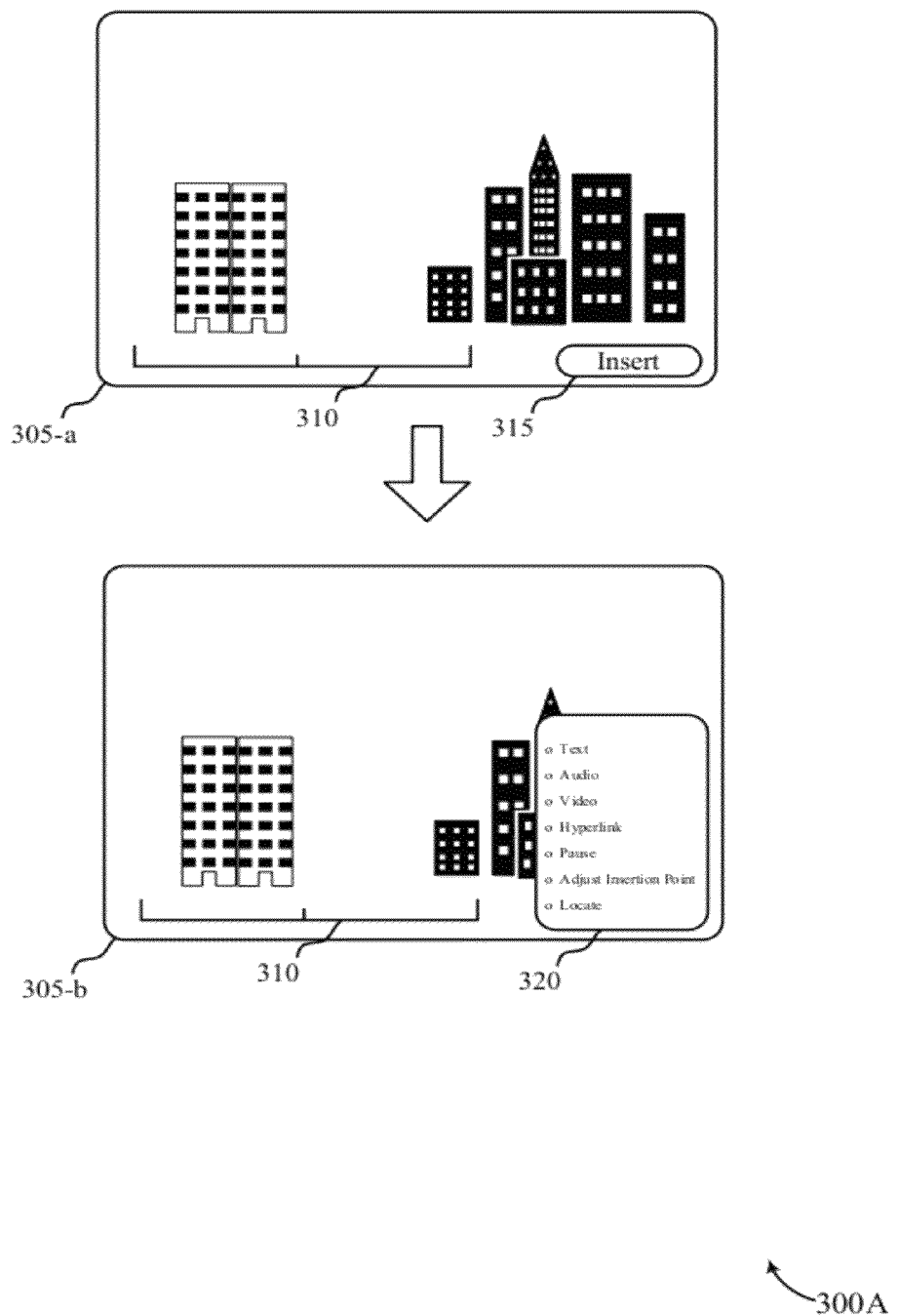
FIG. 3A is a block diagram of an example display according to various embodiments of the invention.

FIG. 3A illustrates an example block diagram 300A of a display 305 with an alternative interface for making comments. This display 305 may be an example of the display 205 described with reference to FIG. 2. The display 305 may be on, or integrated with, a mobile device, mobile phone, laptop, tablet, computer, television, head-mounted display, remote control, or any number of other computing or viewing devices. The display 305 may be a touch screen or be controlled by user inputs into a remote, peripheral, or other mobile device. In the illustrated display 305, an insert icon 315 and scrubber control 310 are overlaid on the content. However, in other embodiments, the interface may be independent or on another screen or window from the content. The scrubber control 310 allows a user to control the underlying media, control the insertion of comments, set the timing of comment display, set the duration of the media subunits captured by the comment, zoom into the media time line, and other functions.

Display 305-*a* illustrates the interface at Time1, with an insert icon 315 and scrubber control 310 overlaid on the content. A user may use the scrubber control 310 to identify the proper place for comment insertion, and then may click on, or otherwise select, the insert icon 315. Display 305-*b* illustrates the interface at Time2. A comment type window 320 appears in response to the selection of the insert icon 315 to allow the user to comment via text, audio, video, animation, or hyperlink or other methods, insert a pause, and adjust the insertion point. In addition, the user can further select the "locate" option for the ability to associate the selected option (e.g., text, audio, video, animation, or hyperlink) with a specific screen location.

Figure 3B:
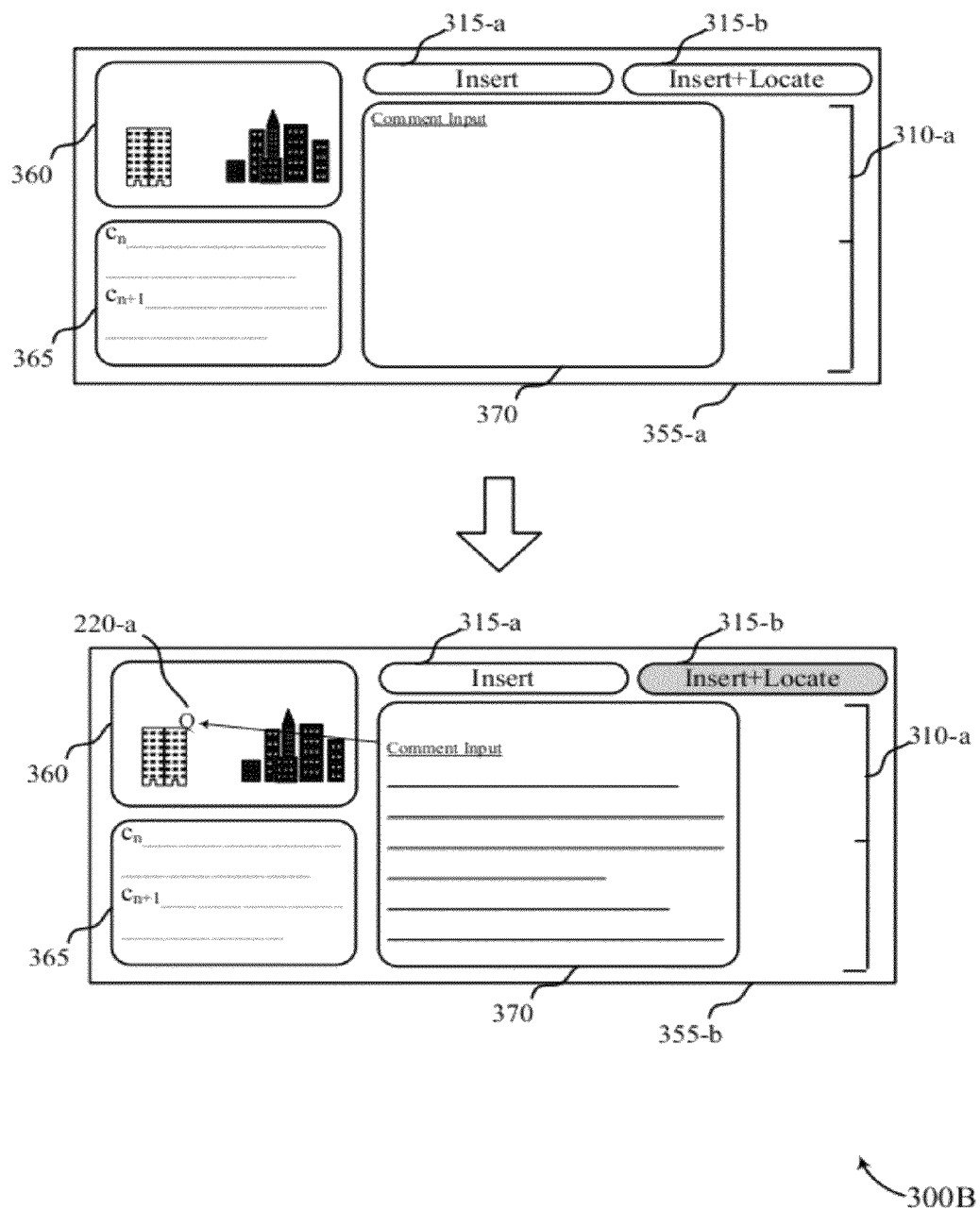
FIG. 3B is a block diagram of an example display according to various embodiments of the invention.

FIG. 3B is a block diagram 300B of a display 355 with an alternative interface for making comments. This display 355 may be an example of the display 205 described with reference to FIG. 2. The display 355 may be on, or integrated with, a mobile device, mobile phone, laptop, tablet, computer, television, head-mounted display, remote control, or any number of other computing or viewing devices. The display 355 may be a touch screen or be controlled by user inputs into a remote, peripheral, or other mobile device. In the illustrated display 355, an insert icon 315-*a*, insert and locate icon 315-*b*, scrubber control 310-*a*, content window 360, comment stream from other commentators 365, and comment entry window 370 are in different windows within the display 355. However, in other embodiments, each interface may be overlaid or integrated or on a screen, or some subset of this functionality may be on a different device.

Referring to the display 355-*a* at Time1, a user may use the scrubber control 310-*a* to identify the proper time for comment insertion, and then may click on, or otherwise select, the insert icon 315-*a* to insert a general (non location-specific) comment. The user may click on, or otherwise select, the insert and locate icon 315-*b* to insert a location specific comment. This display configuration allows a user to view the underlying content via content window 360 (and perhaps look at other location specific comments (not shown)). A user may view the comment stream 365 (perhaps screen location-specific comments or otherwise filtered), and input comments into the comment entry window 370. In some examples, comments from the comment stream 365 may be dragged and dropped into the comment entry window 370, or otherwise selected for a comment set or other use. There may be threaded discussions, or comments from others may be pulled in.

The display 355-*b* at Time2 illustrates an example of when a user has clicked on, or otherwise selected, the insert and locate icon 315-*b* to insert a location-specific comment. A location indicator 220-*a* (here marked by a "Q") shows the user selected screen location that will be associated with the comment.

The system architecture for location-specific comment creation and viewing may take on a variety of forms. In some examples, DVD, broadcast, or streaming content may be received on a computer, set top box, or television. A user interface control (e.g., the control functions of the configurations illustrated in FIG. 2, 3A, or 3B) may be in the same screen, but distinct from the content (e.g., overlaid, or in separate windows) for either creating or viewing comments. The user interface control and the content may be on different devices. The user interface control may use various mechanisms to associate a timestamp and screen location with the entry of a comment. In different embodiments, the user interface control may be integrated with content to varying degrees. The control window may receive inputs via a remote control, mobile device, keyboard, or other peripheral. The user interface control may control underlying content (i.e., pausing underlying content), or not, and the user interface control may convey the underlying content to other devices for viewing while retaining player control and other functions.

Time, screen location, and object-specific comments may be created for the content. A user interface control of an input device allows a user to generate a comment, associated with a time code and screen location. By using a time code and screen location indicator as an external reference, the comment need not actually be inserted into the multimedia. The user interface control may be generated locally or served from the central server computer system. A user interface control of an output device allows a user to view a comment associated with a time code and screen location.

In one example, the content stream and user interface control are independent and distinct from each other (even when both are on the same display). In other embodiments, the content stream and user interface control are overlaid or partially integrated, and the placement location of the icon for a comment may be overlaid on the screen itself. In still other embodiments, the content stream and user interface control are tightly integrated.

The term "screen location," and other like terms, are to be construed broadly. For example, instead of choosing a specific location on the screen, a user may select an object or area to be associated with a comment. By selecting an object (for example, a person), the comment may move with the object within the screen.

Figure 4:
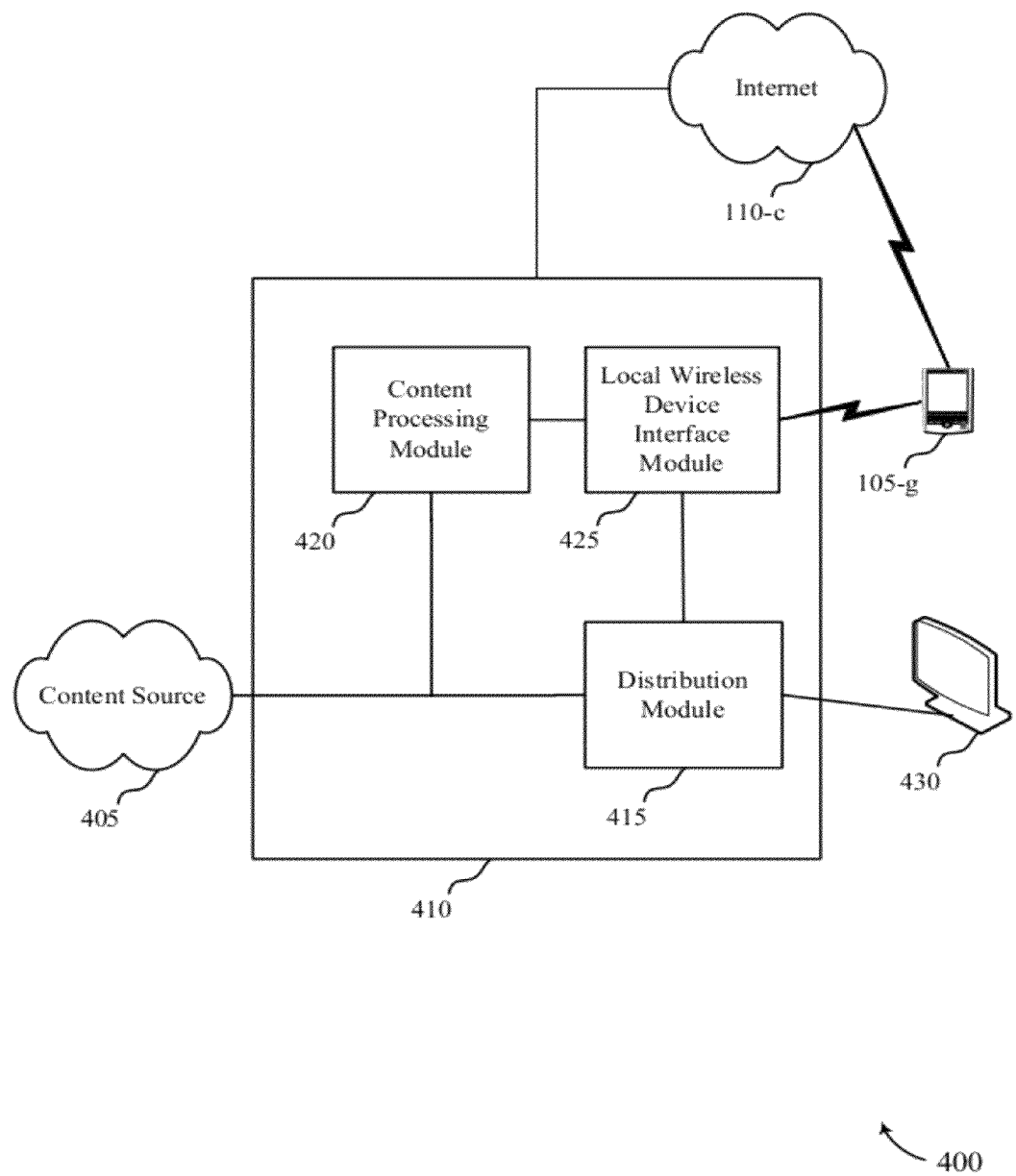
FIG. 4 is a block diagram of a system according to various embodiments of the invention.
Figure 5:
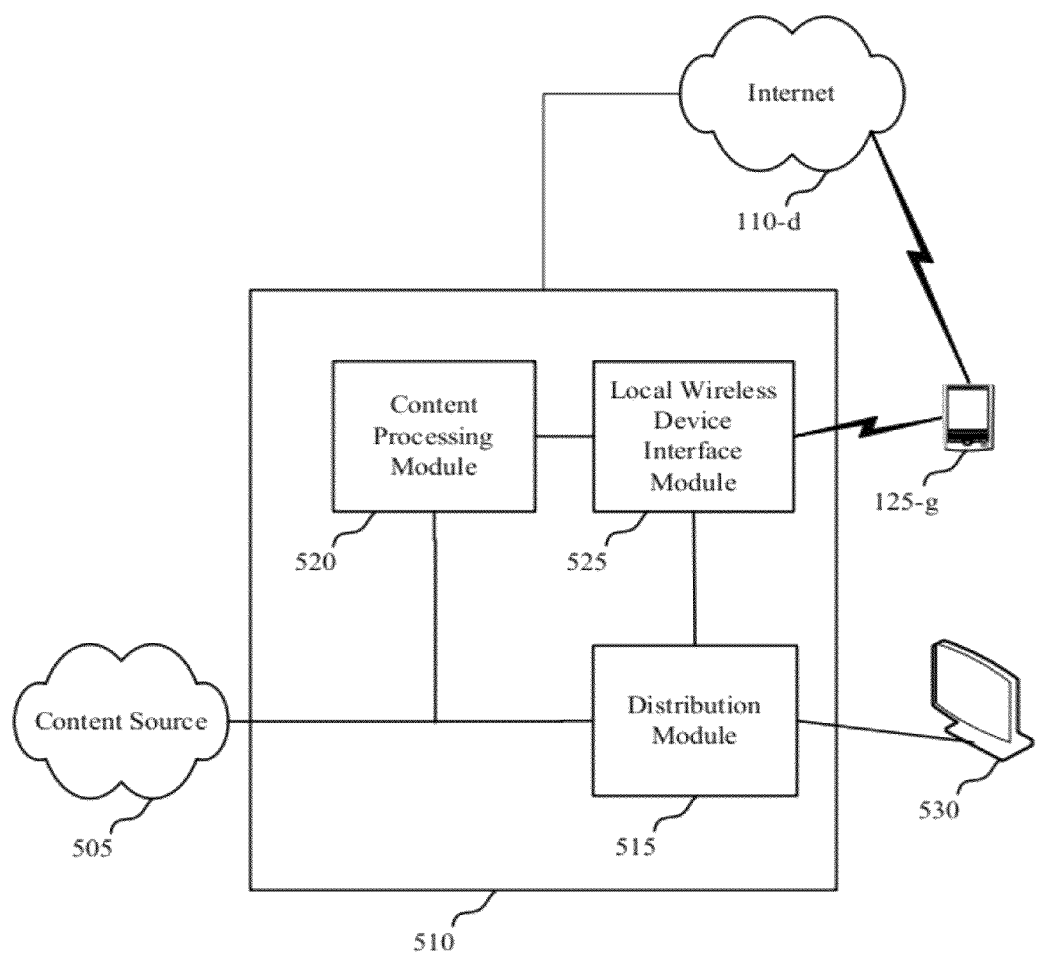
FIG. 5 is a block diagram of a system according to various embodiments of the invention.

FIGS. 4 and 5 illustrate various examples of system architectures for viewing and/or creating comments. These are merely examples, and should not be interpreted to limit possible architectures. Different communication links and system components may be eliminated in some embodiments. FIG. 4 illustrates a system 400 for creating screen location specific comments, which includes a content source 405 (which may be a DVD or other video disc player, a local or remote storage device, a central server computer system), a set top box 410, a mobile device 105-g (e.g., a tablet, smartphone, remote control, cell phone, head-mounted display, or laptop), and a display 430 (e.g., television or other display). The set top box 410 includes a distribution module 415, content processing module 420, and local wireless device interface module 425. Each of these components may be in communication with each other, directly or indirectly. This system 400 may be the system 100 of FIG. 1.

In one example, the content source 405 streams content to the set top box 410, which is stored by the content processing module 420. The content processing module 420 may create an echo of the content (e.g., a low resolution version of the content). In parallel (or substantially in parallel), the content processing module 420 may provide a regular or high definition version of the content to distribution module 415 for delivery to display 430, while also delivering the echo version to the local wireless device interface module 425. Local wireless device interface module 425 may deliver the echo version wirelessly to the mobile device 105-g. The mobile device 105-g may control the playback of the echo to time the insertion of comments from the mobile device 105-g, and this echo timing may be distinct and independent from the content playback on the display 430 (i.e., the echo version and regular/high definition need not be synchronized). The mobile device 105-g may utilize the echo to show placement of the screen location to a user for the comment (although, also or alternatively, the screen location for the comment may be shown on the display 430, wherein the distribution module 415 (in communication with the mobile device 105-g via local wireless device interface module 425) overlays the screen location icon on the underlying content). In some embodiments, the playback of the echo version and the regular/high definition version are synchronized so that control to stop, pause, fast forward, rewind at the display 430 (for the regular/high definition version) or the mobile device 105-g (for the echo version or the regular/high definition version) controls both displays.

Local wireless device interface module 425 may generate a user interface control for delivery to the mobile device 105-g. This user interface control may be transmitted with the echo version of the content to mobile device 105-g. Alternatively, the user interface control may be generated locally (e.g., as an App stored at the mobile device 105-g), wherein the echo version is integrated with the user interface control at the mobile device 105-g. The user interface control may have functionality to specify the placement location of the comments.

The set-top box 410 (or any components therein) may be in communication with a central server computer system (not shown, but e.g., central server computer system 115 of FIG. 1) via the internet 110-c. The set-top box 410 may transmit the time code and screen location selection to the central server computer system. Alternatively, or in combination, the mobile device 105-g (or any components therein) may be in communication with a central server computer system (not shown, but e.g., central server computer system 115 of FIG. 1) via the internet 110-c. The mobile device 105-g may transmit the time code and screen location selection to the central server computer system.

There are a number of other ways an echo may be pulled out of the stream for time code and screen location placement needs. Echo creation and screen location identification functionality may occur at a central server computer system, on the set top box 410, at the display 430, or at the device 105-g. This echo may also be designed so that it satisfies the need for 1) time code synchronization, 2) rough visual cross-checking to help a user ensure that comments and screen location match up with desired input timing, 3) scrubbing for fine tuning of comment placement, 4) delivery to comment servers to cross-check or identify media or provide synchronization, or 5) any combination of these uses.

FIG. 5 illustrates a system 500 for receiving location-specific comments which includes a content source 505 (which may be a DVD or other video disc player, a local or remote storage device, a central server computer system), a set top box 510, a mobile device 125-g (e.g., a tablet, smartphone, remote control, cell phone, head-mounted display, or laptop), and a display 530 (e.g., television or other display). The set top box 510 includes a distribution module 515, content processing module 520, and local wireless device interface module 525. Each of these components may be in communication with each other, directly or indirectly. This system 500 may be the system 100, 400 of FIG. 1 or 4. Thus, an input device 105 and output device 125 may be the same device.

In one example, the content source 505 streams content to the set top box 510, which is stored by the content processing module 520. The content processing module 520 may create an echo of the content (e.g., a low resolution version of the content). In parallel (or substantially in parallel), the content processing module 520 may provide a regular or high definition version of the content to distribution module 515 for delivery to display 530, while also delivering the echo version to the local wireless device interface module 525. The mobile device 125-*g* may specify preferences for comment viewing (e.g., filtering comments based on preferences, screen location, etc.), and the local wireless device interface module 525 may access comments via the internet 110-*d* according to these preferences. The local wireless device interface module 525 may deliver the echo version wirelessly to the mobile device 125-*g*, illustrating the location of comments on the echo screen. The mobile device 125-*g* may be used by the user to specify the location of comments that he or she would like to view. The mobile device 125-*g* may control the playback of the echo to time the viewing of comments from the mobile device 125-*g*, and this echo timing may be distinct and independent from the content playback on the display 530 (i.e., the echo version and regular/high definition are not synchronized). In other embodiments, the playback of the echo version and the regular/high definition version are synchronized (so that control to stop, pause, fast forward, rewind at the display 530 (for the regular/high definition version) or the mobile device 125-*g* (for the echo version or the regular/high definition version) controls both displays). In some embodiments, the comments may be displayed on display 530.

Local wireless device interface module 525 may generate a user interface control for delivery to the mobile device 125-*g*. This user interface control may be transmitted with the echo version of the content to mobile device 125-*g*. Alternatively, the user interface control may be generated locally (e.g., as an App stored at the mobile device 125-*g*), wherein the echo version is integrated with the user interface control at the mobile device 125-*g*.

The set-top box 510 (or any components therein) may be in communication with a central server computer system (not shown, but e.g., central server computer system 115 of FIG. 1) via the internet 110-*c*. The set-top box 510 may receive comments, time code, and screen location information from the central server computer system. Alternatively, or in combination, the mobile device 125-*g* (or any components therein) may be in communication with a central server computer system (not shown, but e.g., central server computer system 115 of FIG. 1) via the internet 110-*d*. The mobile device 125-*g* may receive comments, time code, and screen location information from the central server computer system.

FIGS. 6A, 6B, 6C, and 7 illustrate a number of examples of different display interfaces that may be used for viewing screen location and time-specific comments. The presence of time- and location-specific comments may be displayed as icons or with other indicators on a display and/or secondary device. For playback, a variety of techniques may be used to indicate that comments placed at a certain time are associated with a specific location. An icon may be shown for each comment, or an icon can be shown with different transparencies to illustrate the number of comments. Objects may be controlled to glow, shimmer, or have different color features when comments become active. Users may control this so they can set the noise level for given content.

Figure 6A:
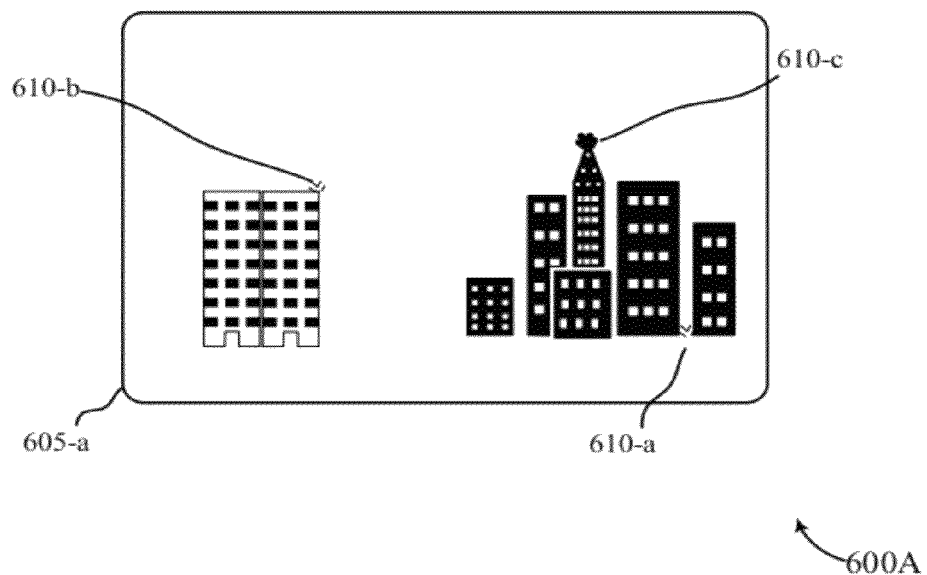
FIG. 6A is a block diagram of an example display according to various embodiments of the invention.

Thus, in one embodiment, there may simply be a grouping of lines or other indicator overlaid on a given piece of content. This overlay can, for example, be performed by the distributor module 515 of FIG. 5. Alternatively, these indicators may be placed on the echo version only. FIG. 6A illustrates an example block diagram 600A of a display 605-*a*. The display 605-*a* may be on, or integrated with, a mobile device, mobile phone, laptop, tablet, computer, television, head-mounted display, remote control, or any number of other computing or viewing devices. The display 605-*a* may be a touch screen or be controlled by user inputs into a remote, peripheral, or other mobile device. In the illustrated display 605-*a*, the indicators 610 of location-specific comments are overlaid on the content. The transparency of the indicators illustrate the amount of comments associated with each indicator (e.g., 610-*a*, 610-*b*, or 610-*c*). However, in other embodiments, the indicators may be independent or on another screen or window from the content.

A viewer may click on a specific indicator or select an area of indicators to view or get more information on the comments. As noted, comments are not limited to text, but may include text, video, audio, photographs and other images, graphical overlays, animations, musical notations, geographic coordinates, discussion threads, external and internal links and associations with media, meta-media or other comments, software applications and applets, special notations to set and grant permissions and define system behaviors or any combination thereof. Comments of different types may have different colored or shaped icons.

Figure 6B:
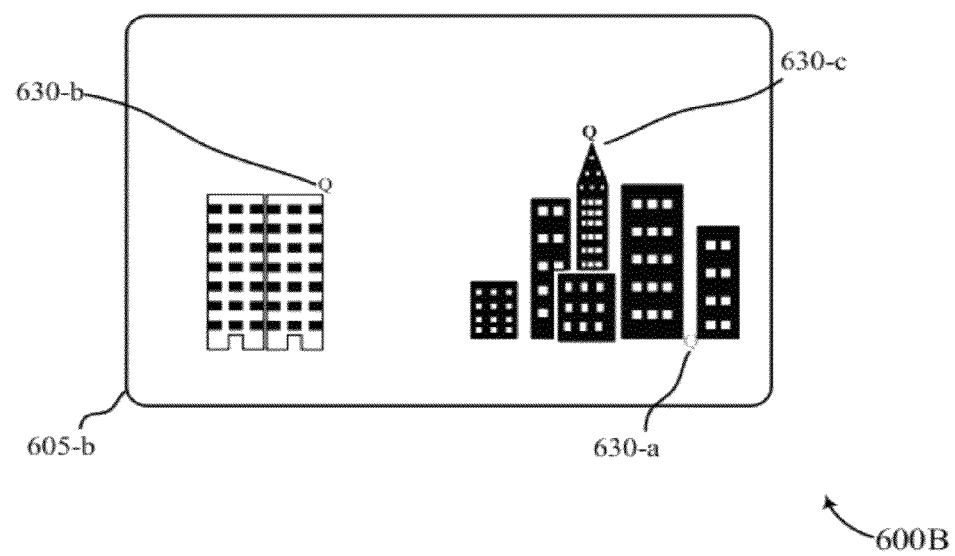
FIG. 6B is a block diagram of an example display according to various embodiments of the invention.

FIG. 6B illustrates an example block diagram 600B of a display 605-*b*. The display 605-*b* may be on, or integrated with, a mobile device, mobile phone, laptop, tablet, computer, television, head-mounted display, remote control, or any number of other computing or viewing devices. The display 605-*b* may be a touch screen or be controlled by user inputs into a remote, peripheral, or other mobile device. In the illustrated display 605-*b*, the indicators 630 of location-specific comments are again overlaid on the content, and marked with the letter Q. The transparency of each Q illustrates the amount of comments associated with the respective Q (i.e., 630-*a*, 630-*b*, or 630-*c*) at a given time in the content playback.

A viewer may click on a Q or select an area of Qs to view or get more information on the comments. As noted, comments are not limited to text, but may include text, video, audio, photographs and other images, graphical overlays, animations, musical notations, geographic coordinates, discussion threads, external and internal links and associations with media, meta-media or other comments, software applications and applets, special notations to set and grant permissions and define system behaviors or any combination thereof. Comments of different types may have different letters, or different colors, shapes, effects, or fonts. Comments taking the form of an animation, for example, may be overlaid on the image in ways that make use of 2D or 3D environments to display them joined with the media so that objects in the media and comments are able to, for example, occlude each other from view. These techniques may be used to hide comment or media objects or to allow a comment object, created as an animation, for example, to overlay and substitute for an object in the media. Comments and comment markers also may be made to appear closer or more distant to show their relevance to the user's interests, for example, or to show their relationship and relevance to areas of the viewing field not tied to a particular object. Further embodiments may allow the system or its users to take further advantage of a 3D environment by creating, for example, storage areas, hidden icons or objects, embedded images or video that join with the underlying media. Such techniques may allow users the ability, for example, to augment 2D and 3D media in such a way as to, for example, add or remove objects or characters from a movie scene. Similar techniques may be used in non-visual media such as music by way of visualizations, as mentioned above, that may allow an object in a visualization to be identified. Such an object may represent a particular musical instrument, for example, and it may allow the sound of that instrument to be overlaid or augmented, or removed from a piece of music. Comments embedded at points in a media time line may be expanded along a new time axis to create time line spurs or parallel tracks offering user's a view of alternate outcomes or alternate back stories. Comments may be similarly used to fill in or imagine missing sections of a story and be used in conjunction with object substitution to radically alter a story. Comments may similarly be used in conjunction with comment splices to depart from the original media's time sequencing, creating entertainment, editing and gaming opportunities that further allow the user to join and augment the underlying media. Techniques may further allow a user's comments or avatar to occupy spaces within 2D and 3D environments from which a new visual perspective on the media may be created and shown to another viewer or participant. Techniques may also be employed to display comments, comment clusters, comment sequences, comment markers, and comment associations separately from the media or joined with it in 2D or 3D to map, graph, track and otherwise illuminate relationships among comments and media and their movement through time. Such techniques may also be used within a 2D or 3D light field image or video where possible and may have a similar range of uses in addition to which a user may be able to adjust the focus and visibility of objects and areas of an image or screen.

Figure 6C:
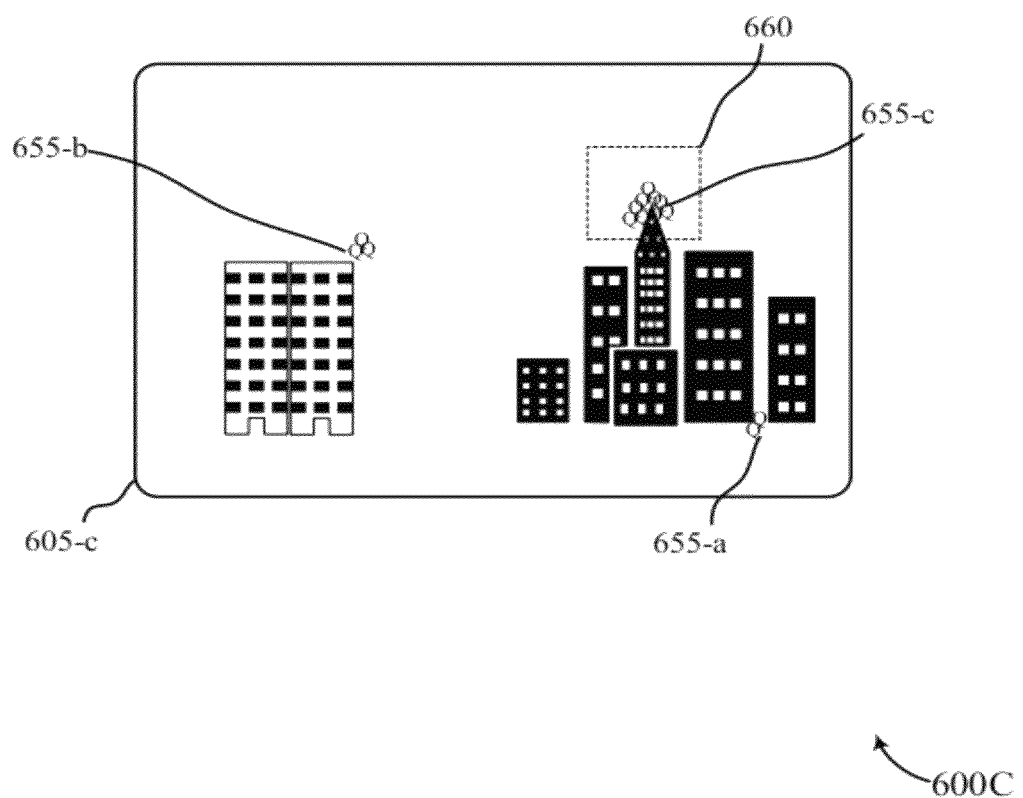
FIG. 6C is a block diagram of an example display according to various embodiments of the invention.

FIG. 6C illustrates an example block diagram 600C of a display 605-c. The display 605-c may be on, or integrated with, a mobile device, mobile phone, laptop, tablet, computer, television, head-mounted display, remote control, or any number of other computing or viewing devices. The display 605-c may be a touch screen or be controlled by user inputs into a remote, peripheral, or other mobile device. In the illustrated display 605-c, the indicators 655 of location-specific comments are again overlaid on the content, and each comment is marked with the letter Q. The number of Qs illustrates the amount of comments.

Each comment may be selected individually, or a group may be selected for viewing. A viewer may click on a Q or select an area 660 of Qs to view or get more information on the comment or set of comments. As noted, comments are not limited to text, but may include text, video, audio, photographs and other images, graphical overlays, animations, musical notations, geographic coordinates, discussion threads, external and internal links and associations with media, meta-media or other comments, software applications and applets, special notations to set and grant permissions and define system behaviors or any combination thereof. Comments of different types may have different letters, or different colors, shapes, or fonts.

Figure 7:
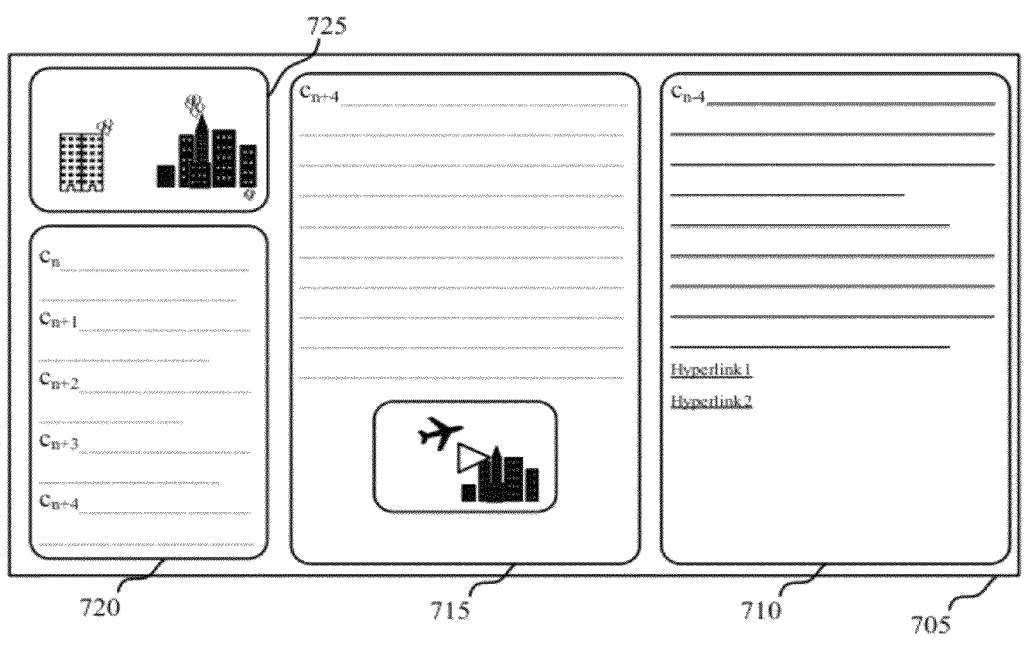
FIG. 7 is a block diagram of an example display according to various embodiments of the invention.

FIG. 7 illustrates an example block diagram 700 of a display 705. The display 705 may be on, or integrated with, a mobile device, mobile phone, laptop, tablet, computer, television, head-mounted display, remote control, or any number of other computing or viewing devices. The display 705 may be a touch screen or be controlled by user inputs into a remote, peripheral, or other mobile device. In the illustrated display 705, a favorites window 710 (e.g., favorite or primary commentators, friends, etc), a selected comment window 715 (with full text and video viewing), a comment stream from other commentators 720, and content display 725 are in different windows within the display 705. However, in other embodiments, each interface may be overlaid or integrated or on a screen, or some subset of this functionality may be on a different device. In the illustrated display 725, the indicators of location-specific comments are again overlaid on the content, and each comment is marked with the letter Q. The number of Qs illustrates the amount of comments.

A viewer may click on a Q or select an area of Qs to view (e.g., in window 715, 720) or get more information on the comment or set of comments. As noted, comments are not limited to text, but may include text, video, audio, photographs and other images, graphical overlays, animations, musical notations, geographic coordinates, discussion threads, external and internal links and associations with media, meta-media or other comments, software applications and applets, special notations to set and grant permissions and define system behaviors or any combination thereof. Comments of different types or from different sources may have different letters, or different colors, shapes, fonts or other aspects that distinguish them.

Figure 8:
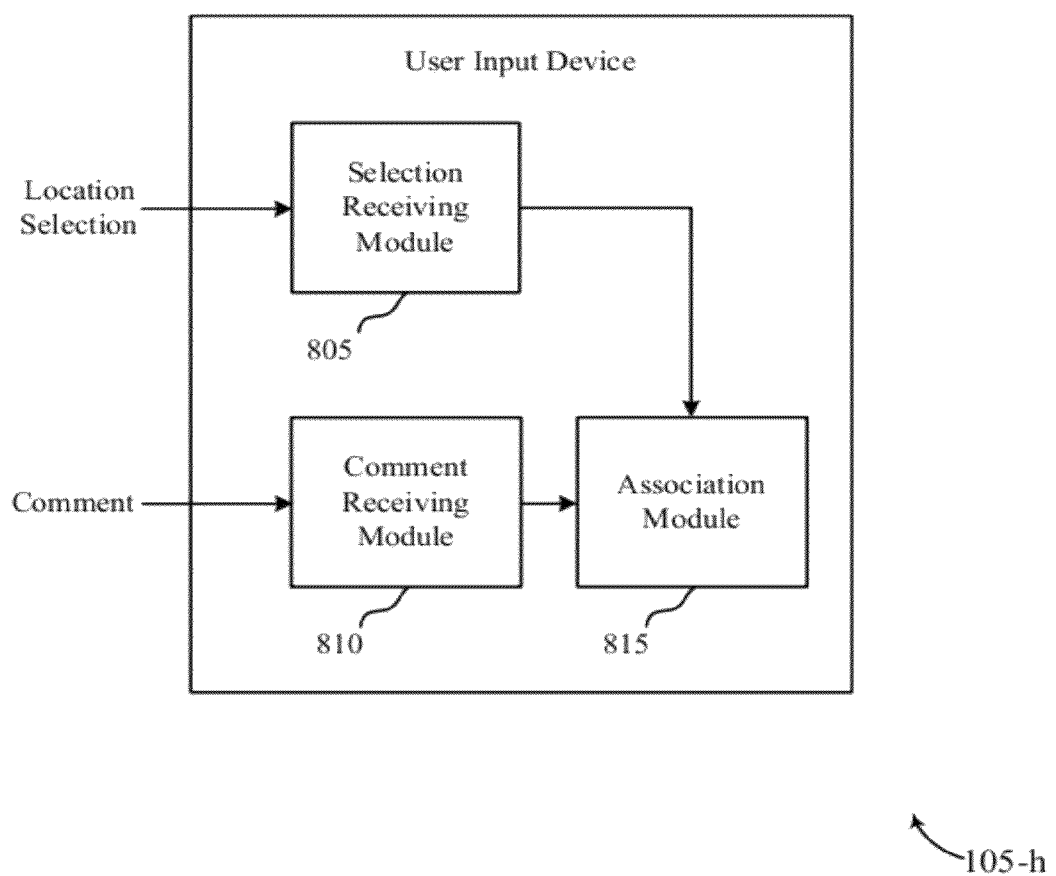
FIG. 8 is a block diagram of an example input device according to various embodiments of the invention.

Referring now to FIG. 8, a block diagram of an example of a user input device 105-h is shown. The user input device 105-h may interact with a user during playback of media content to receive and store comments about specific portions of the media content. The user input device 105-h may be an example of the user input device 105 described above with respect to FIG. 1 or 4. The user input device 105-h may provide a user interface which allows the user to generate comments about media content and associate the comments with selected screen locations during the playback of the media content.

The user input device 105-h of the present example includes a selection receiving module 805, a comment receiving module 810, and an association module 815. Each of these components may be in communication, directly or indirectly. The selection receiving module 805 may interact with the user to receive from the user a selection of a screen location during the playback of the media content for insertion of a comment. The screen location may be selected as described above with reference to FIG. 2, 3A, 3B, 6A, 6B, 6C, or 7. As described above, the selected screen location may be or include an object identified at or near the screen location during playback of the media content. The first point may be selected in real time during the playback of the media content and/or retroactively.

In certain examples, the selection receiving module 805 may also receive a selection of one or more points in time during the playback of the media content for association with a single comment and the selected location. For instance, the user may select a screen location for the period of time between point A and point B during the playback of the media content for insertion of a comment.

The comment receiving module 810 may be configured to receive a comment from the user. The user may intend that the comment be associated with the screen location, and in some embodiments, with the one or more points during the playback of the media content, as received by the selection receiving module 805. The received comment may include text and/or other content. In certain examples, the comment may include recorded audio, video, hyperlinks, animated content, and/or other content. As described previously, some comments may even include software functionality, such as applications or applets, that may be invoked when the comments are viewed. For instance, a comment may include executable code such that when the comment is viewed, the code is executed to display an interactive activity to the viewer.

In additional or alternative examples, the comment(s) received at the comment receiving module 810 may be associated with one or more existing comments to allow a viewer of the comments to move through a daisy chain or other linked organization of comments, as described previously. Thus, when a comment is received at the comment receiving module 810, the user input device 105-*h* may be further configured to receive a selection of a second comment from the user for association with the first comment.

Once the selection of the screen location and, where applicable, one or more points in time during the playback of the media content have been received by the selection receiving module 805 and the comment has been received by the comment receiving module 810, the association module 815 may be configured to associate the received comment with the selected screen location for the specified period during the playback of the media content. Where applicable, the association module 815 may also associate the received comment with one or more other comments.

The association of the received comment with the selected screen location and period during the playback of the media content may be accomplished in a number of ways. In certain examples, the comment may be annotated with one or more pointers to the selected screen location, a selected start point, and/or a selected termination point during the playback of the media content. Additionally or alternatively, a record of the selected screen location, the selected start point, and/or the selected termination point may be annotated with a pointer to the comment. In still other examples, a central database may include references to comments, screen locations, and points during the playback of the media content, such that a reference to the received comment in the central database is associated with references to the selected screen location and points during the playback of the media content.

In certain embodiments, the user input device 105-*h* may be the same device used by the user to view the playback of the media content. For example, the user input device 105-*h* may be a laptop or tablet computer which simultaneously plays the media content to the user and allows the user to generate comments for association with specific points in the film. Alternatively, the user input device 105-*h* may be separate from a device used to playback the media content. For example, the user input apparatus 105-*h* may be a notebook or tablet computer on which the user enters comments while watching content provided to a television by a set top box. In such examples, some degree of synchronization may occur between the user input device 105-*h* and the device on which playback occurs.

Figure 9:
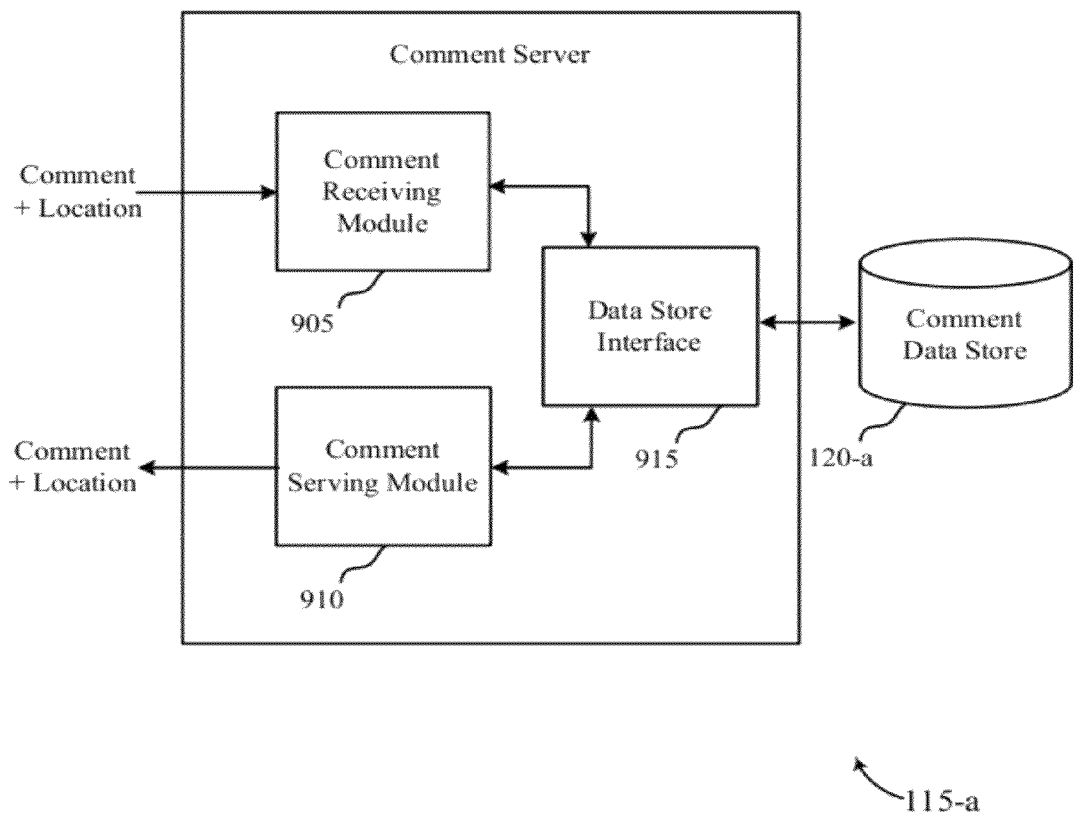
FIG. 9 is a block diagram of an example comment server according to various embodiments of the invention.

Referring next to FIG. 9, a block diagram of an example comment server 115-*a* is shown. The comment server 115-*a* may be an example of the central server computer system 115 described above with reference to FIG. 1. The comment server 115-*a* of the present example includes a comment receiving module 905, a comment serving module 910, and a data store interface 915.

The comment receiving module 905 may be configured to receive a comment generated by a user and a screen location associated with the generated comment. The screen location may correspond to a portion of the screen image during the playback of the media content, and may be associated with a specific period of time during the playback of the media content. The comment and screen location information may be received from a user input device, such as the user input device 105 of FIG. 1, 4, or 8. The comment and associated screen location information may also include data related to an object or other image feature displayed at the selected screen location.

The data store interface 915 may communicate with a comment data store 120-*a* to associate and store the received comment and screen location information in the data store 120-*a*. The data store 120-*a* may be an example of the data store 120 described above with reference to FIG. 1. The comment serving module 910 may communicate with an output device, such as the output device 125 described above with reference to FIG. 1 or 5 to provide comments and their associated screen locations to the output device in coordination with the playback of media content.

Figure 10:
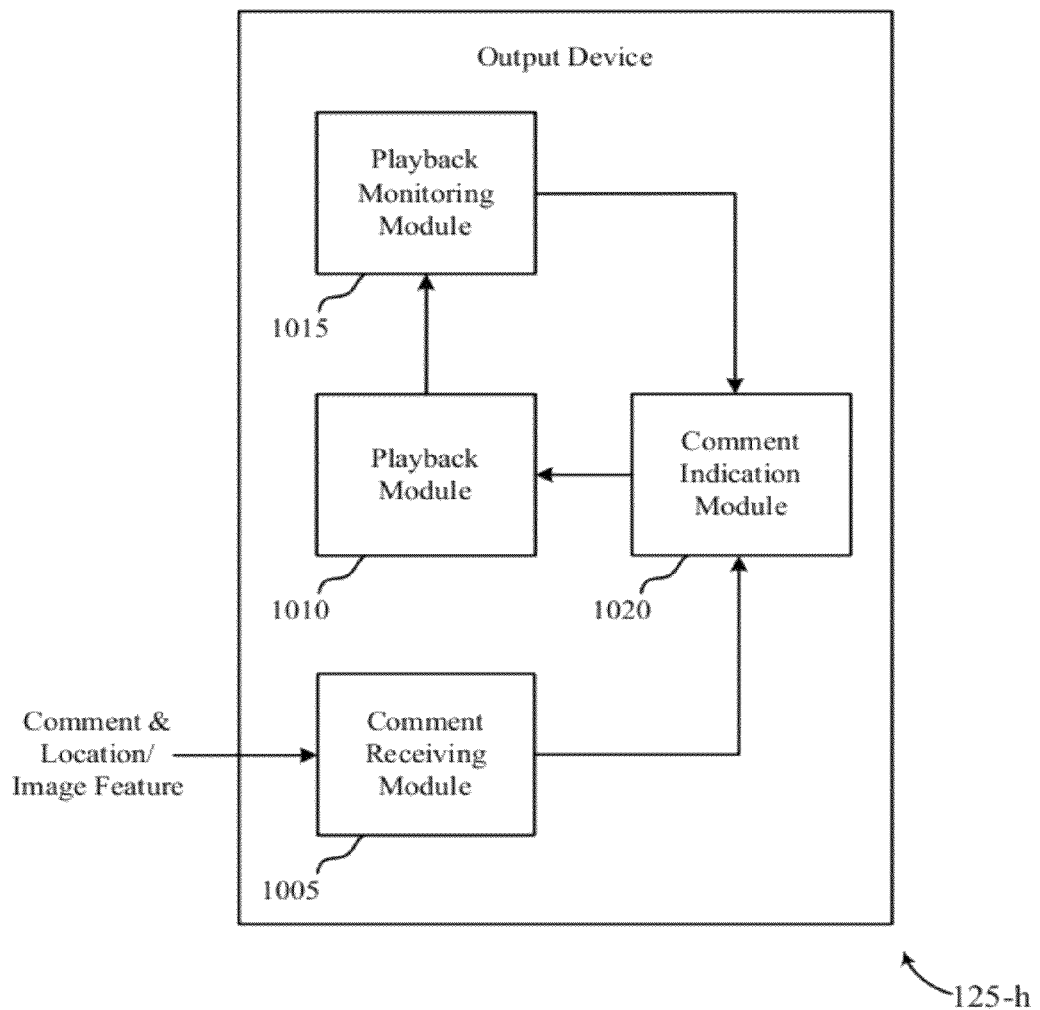
FIG. 10 is a block diagram of an example output device according to various embodiments of the invention.

Referring next to FIG. 10, a block diagram of an example output device 125-*h* is shown. The output device 125-*h* of FIG. 10 may be an example of the output device 125 described above with reference to FIG. 1 or 5. The output device 125-*h* of the present example includes a comment receiving module 1005, a playback monitoring module 1015, a playback module 1010, and a comment indication module 1020. The comment receiving module 1005 of the output device 1005 may receive a comment and associated screen location information from, for example, the comment server 115-*a* described above with respect to FIG. 9. Additionally or alternatively, the comment receiving module 1005 may access a local data store within or associated with the output device 125-*h* to receive the comment and associated screen location information.

The playback module 1010 may be configured to playback media content to a user. As part of the playback of the media content, the playback module 1010 may generate a screen display. The playback monitoring module 1015 may monitor the playback of the media content by the playback module 1010 and determine when the playback of the media content is at a point relevant to the received comment. In certain examples, the point relevant to the received comment may be included with or derived from data received with or otherwise associated with the comment.

Once the playback has progressed to such a point, the playback monitoring module 1015 may trigger the comment indication module to display an indication of the comment at the screen location associated with the comment. As described in more detail previously, the indication may include a letter or other symbol displayed at the screen location. Additionally or alternatively, the indication may include visual effects, such as animations, flashes, shimmers, color changes, and the like. In certain examples, an object or other image feature may be detected at the screen location. In such examples, the position of the object or other image feature may be tracked for a certain period of time, and the indication of the comment may be dynamically updated to follow the position of the object or other image feature as playback of the media content progresses.

Figure 11:
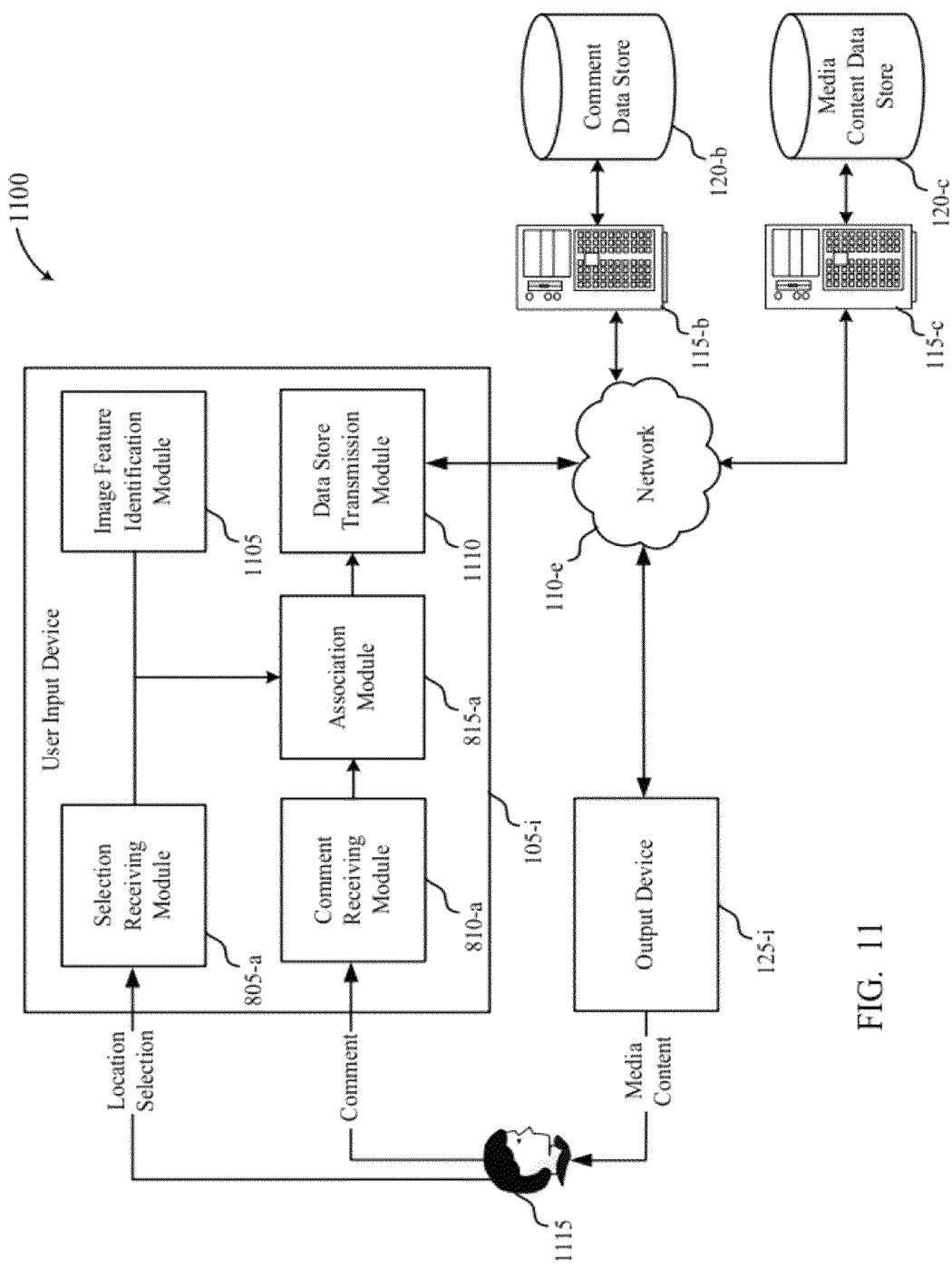
FIG. 11 is a block diagram of an example system according to various embodiments of the invention.

Referring next to FIG. 11, an example of a system 1100 is shown. In the system 1100 of FIG. 11, a user 1115 utilizes a user input device 105-*i* to generate comments about the playback of media content being viewed on an output device 125-*i*. The system 1100 of the present example includes the user input device 105-*i*, the output device 125-*i*, a network 110-*e*, a comment server 115-*b*, a comment data store 120-*b*, a media content server 115-*c*, and a media content data store 120-*c*. Each of these components may be in communication, directly or indirectly.

The system 1100 may be an example of the system 100 described above with respect to FIG. 1, the system 400 described above with respect to FIG. 4, and/or the system 500 described above with respect to FIG. 5. The user input device 105-*i* may be an example of the user input device 105 described above with respect to FIG. 1, 4, or 8. The output device 125-*i* may be an example of the output device 125 described above with reference to FIG. 1, 5, or 10. The network 110-*e* may be an example of the network 110 described above with reference to FIG. 1, 4, or 5. The comment server 115-*b* and the media content server 115-*c* may be examples of the central server computer system 115 described above with reference to FIG. 1. Additionally, the comment server 115-*b* may be an example of the comment server 115-*a* described above with reference to FIG. 9. The comment data store 120-*b* and the media content data store 120-*c* may be examples of the data store 120 described above with respect to FIG. 1 or 9.

Similar to the user input device 105-*h* of FIG. 7, the user input device 105-*i* of the present example includes a selection receiving module 805-*a* for receiving a selection of one or more screen locations during the playback of media content for association with a comment, a comment receiving module 810-*a* for receiving a comment from the user 1115, and an association module 815-*a* for associating the received comment with the selected screen locations during the playback of the media content.

The user input device 105-*i* of the present example also includes an image feature identification module 1105 and a data store transmission module 1110. The image feature identification module 1105 may identify an object or other image feature at the selected screen location during the playback of the media content. This image feature may be associated with a comment received from the comment receiving module 810-*a* in addition to or instead of the selected screen location. The data store transmission module 1110 may transmit the selected one or screen locations and/or the identified object with the received comment over the network 110-*e* to the comment server 115-*b* for storage in the comment data store 120-*b*. The comment may remain associated with the selected screen location(s) or identified object during the playback of the media content in the comment data store 120-*b*.

In the present example, the user 1115 may view the playback of the media content on the output device 125-*i* while concurrently using the user input device 105-*i* to generate comments associated with screen locations and image features during the playback of the media content. In certain examples, the functionality of the user input device 105-*i* and the output device 125-*i* may be implemented by a single user device. The output device 125-*i* may receive the media content from the media content data store 120-*c* by way of the media content server 115-*c* and the network 110-*e*. In other examples, the media content may be played at the output device 125-*i* from a local disk or other form of local memory. In certain examples, the output device 125-*i* may retrieve comments relative to the media content from the comment data store 120-*b* via the comment server 115-*b* and the network 110-*e* for display during playback of the media content.

As shown in FIG. 11, the comment data store 120-*b* and the media content data store 120-*c* may be separate and independent from each other. The comments stored by the comment data store 120-*b* which are intended for display with the media content may be associated with the media content in the data store 120-*b*. In certain examples, the comment data store 120-*b* itself may be associated with one or more articles of media content.

Figure 12:
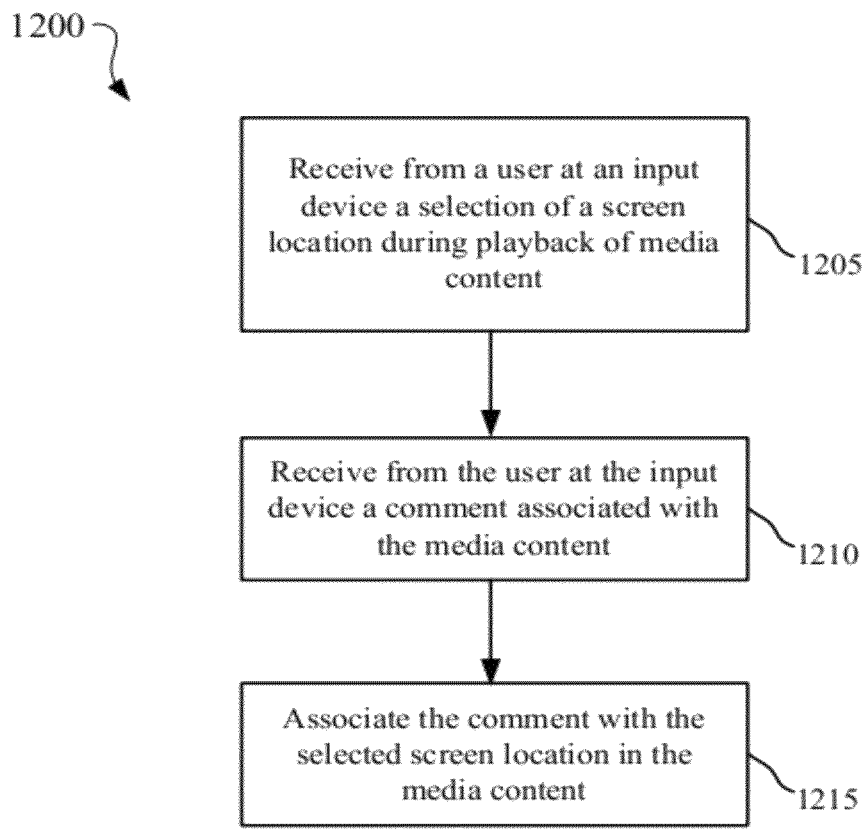
FIG. 12 is a flowchart diagram of an example method of associating comments with screen locations during media content playback according to various embodiments of the invention.

Referring next to FIG. 12, a flowchart of an example method 1200 of associating comments with playback of media content is shown. The method 1200 may be performed, for example, by the user input device 105 described above with respect to FIG. 1, 4, 8, or 11, the central server computer system 115 described above with respect to FIG. 1, and/or the set top box 510 described above with respect to FIG. 5.

At block 1205, a selection of a screen location during playback of media content is received from a user at an input device for insertion of a comment. At block 1210, the input device receives the comment, the comment being associated with the media content. At block 1215, the comment is associated with the selected screen location in the media content.

Figure 13:
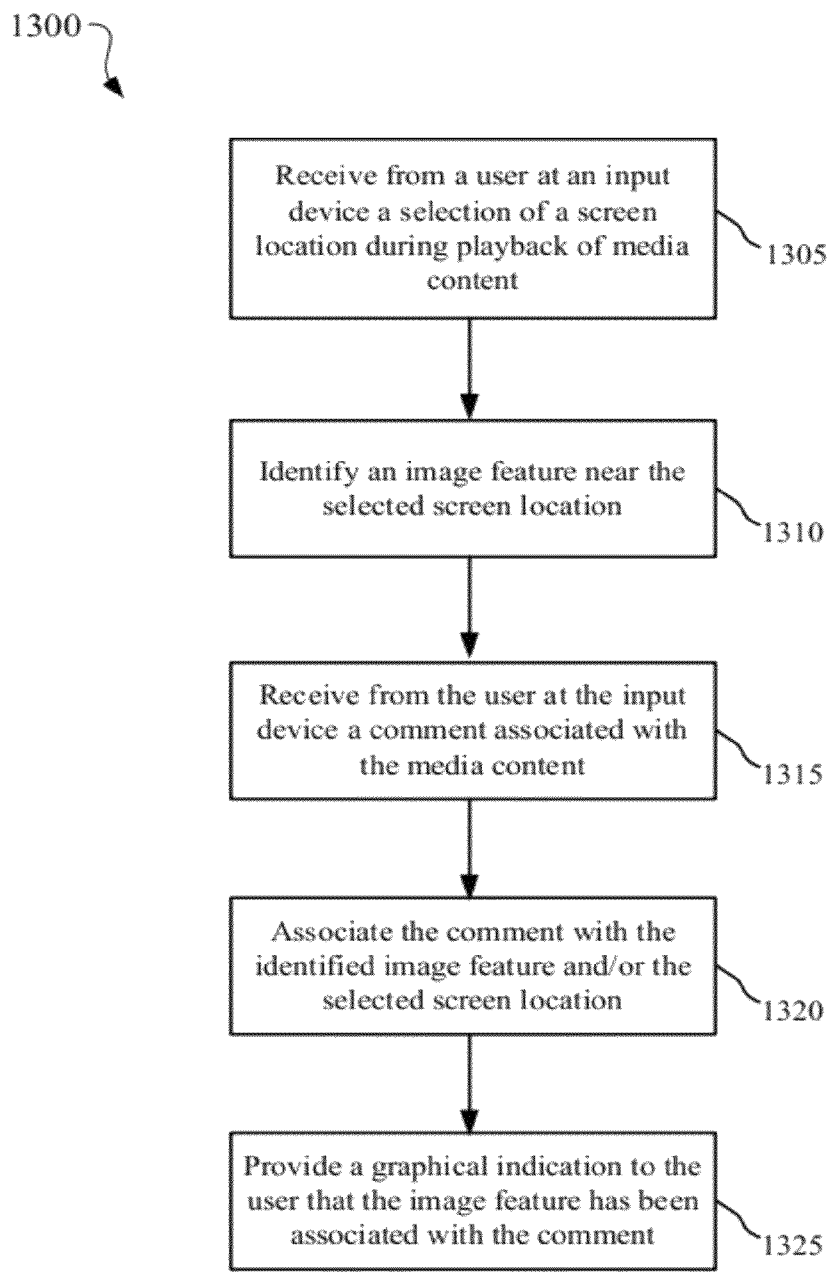
FIG. 13 is a flowchart diagram of an example method of associating comments with screen locations during media content playback according to various embodiments of the invention.

Referring next to FIG. 13, a flowchart of another example method 1300 of associating comments with playback of media content is shown. The method 1300 may be performed, for example, by the user input device 105 described above with respect to FIG. 1, 4, 8, or 11, the central server computer system 115 described above with reference to FIG. 1, and/or the set top box 510 described above with respect to FIG. 5.

At block 1305, a selection of a screen location during playback of media content is received from a user at an input device. At block 1310, an image feature is identified near the selected screen location. At block 1315, a comment associated with the media content is received from the user at the input device. At block 1320, the comment is associated with the identified image feature and/or the selected screen location. At block 1325, a graphical indication is provided to the user that the image feature has been associated with the comment.

Figure 14:
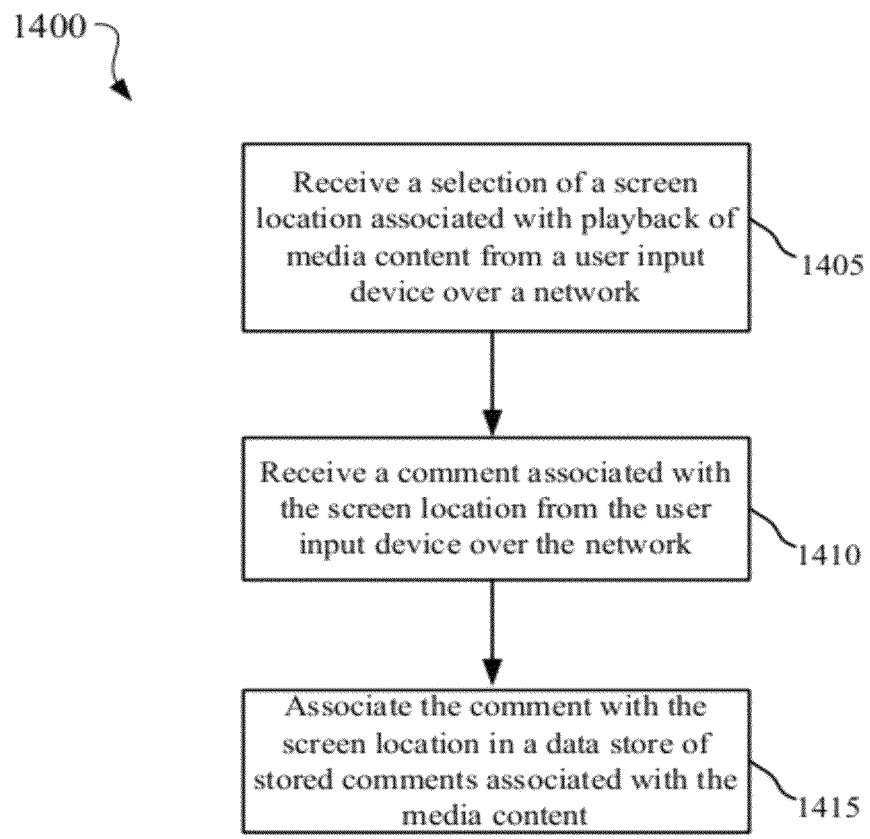
FIG. 14 is a flowchart diagram of an example method of associating comments with screen locations during media content playback according to various embodiments of the invention.

Referring next to FIG. 14, a flowchart of another example method 1400 of associating comments with playback of media content is shown. The method 1400 may be performed, for example, by the comment server 115-*a*, 115-*b* described above with respect to FIG. 9 or 11, the central server computer system 115 described above with respect to FIG. 1, and/or the set top box 510 described above with respect to FIG. 5.

At block 1405, a selection of a screen location associated with playback of media content is received from a user input device over a network. At block 1410, a comment associated with the screen location content is received from the user input device over the network. At block 1415, the comment is associated with the identified screen location in a data store of stored comments associated with the media content.

Figure 15:
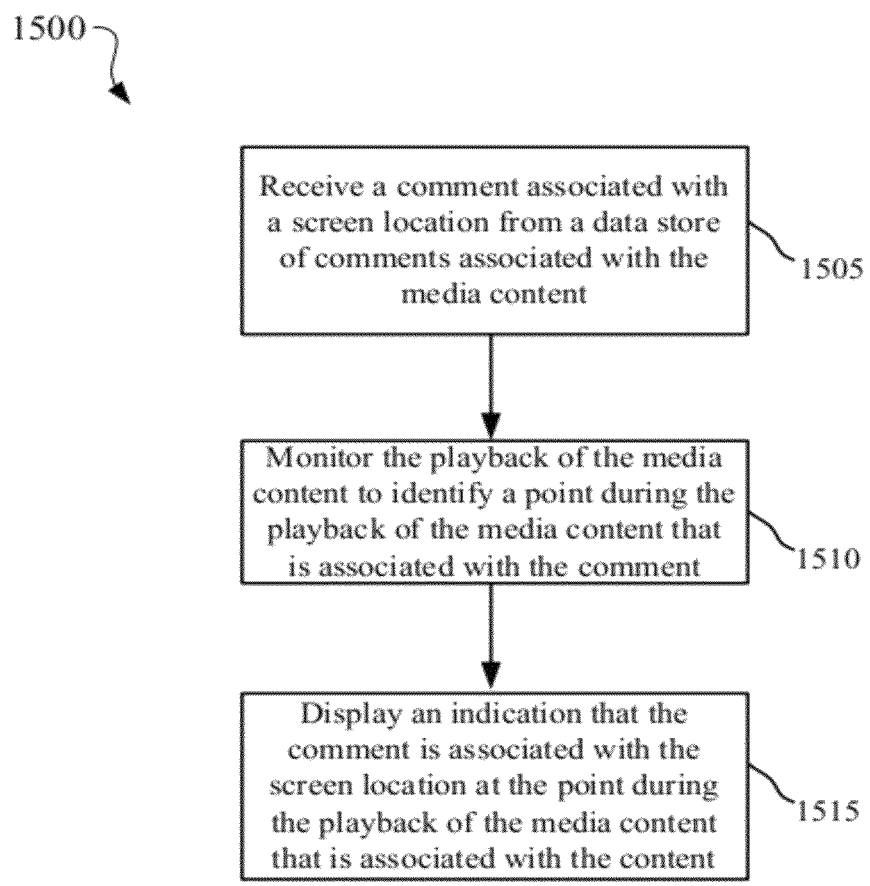
FIG. 15 is a flowchart diagram of an example method of providing comments during media content playback according to various embodiments of the invention.

Referring next to FIG. 15, a flowchart of an example method 1500 of providing comments during playback of media content is shown. The method 1500 may be performed, for example, by the output device 125 described above with respect to FIG. 1, 5, 10, or 11, the central server computer system 115 described above with respect to FIG. 1, the set top box 410 described above with respect to FIG. 4, and/or the set top box 510 described above with respect to FIG. 5.

At block 1505, a comment associated with a screen location is received from a data store of comments associated with the media content. At block 1510, the playback of the media content is monitored to identify a point during the playback of the media content that is associated with the comment. The point may be defined by data appended to or otherwise associated with the comment. At block 1515, an indication that the comment is associated with the screen location is displayed at the point during the playback of the media content that is associated with the comment. The indication may be displayed at the screen location associated with the comment.

Figure 16:
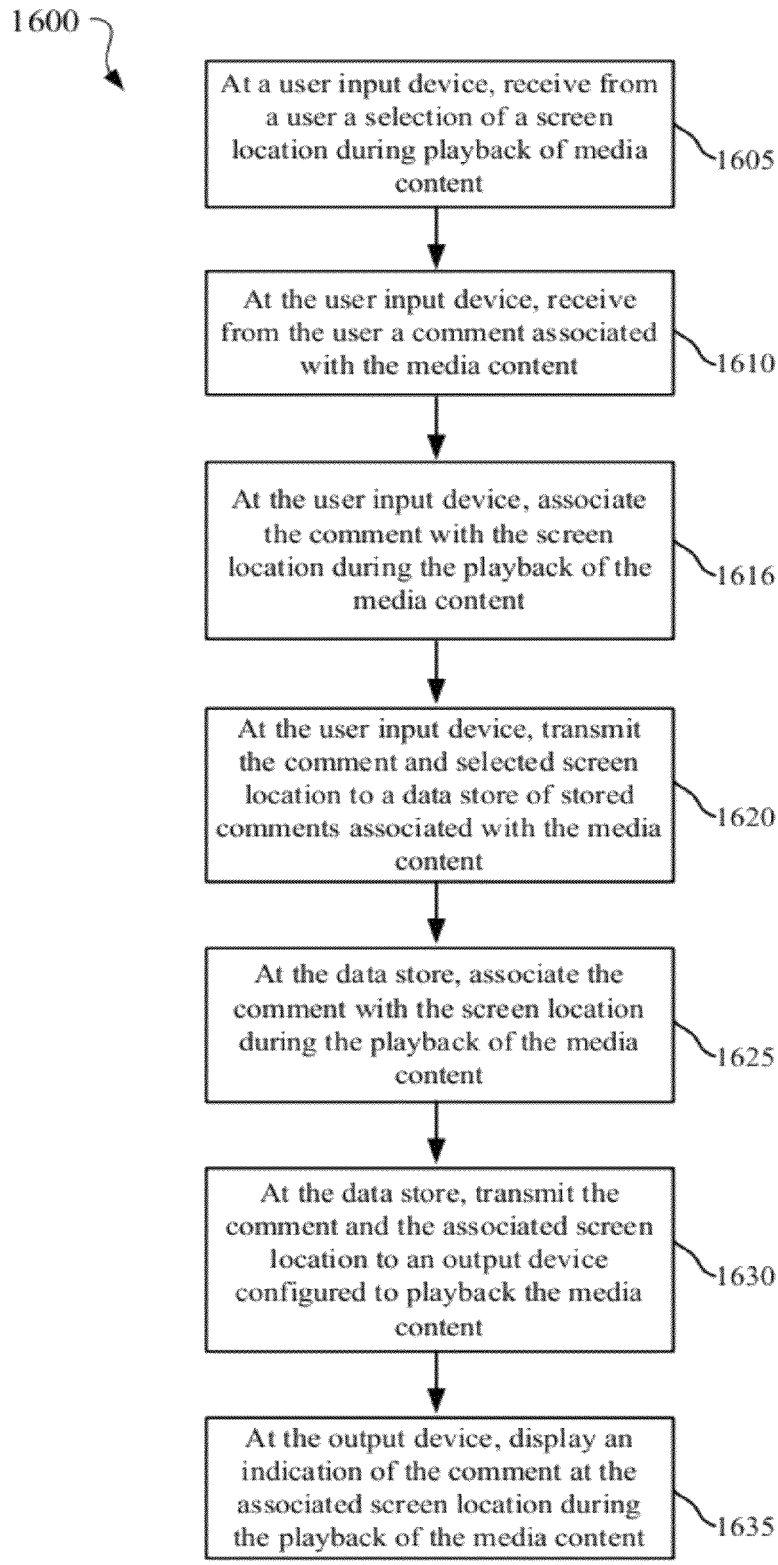
FIG. 16 is a flowchart diagram of an example method of associating comments with screen locations during media content playback according to various embodiments of the invention.

Referring next to FIG. 16, a flowchart of an example method 1600 of providing comments during playback of media content is shown. The method 1600 may be performed, for example, by the system 100 described above with respect to FIG. 1, the system 400 described above with respect to FIG. 4, the system 500 described above with respect to FIG. 5, the user input device described above with respect to FIG. 4, 8, or 11, the set top box 410 described above with respect to FIG. 4, the set top box 510 described above with respect to FIG. 5, the central server computer system 115 described above with respect to FIG. 1, the comment server 115-*a*, 115-*b* described above with respect to FIG. 9 or 11, the output device 125 described above with respect to FIG. 1, 5, 10, or 11, and/or any combination of these elements.

At block 1605, a selection of a screen location during playback of media content is received from a user at a user input device. At block 1610, a comment associated with the media content is received from the user at the user input device. At block 1615, the comment is associated with the screen location during the playback of the media content at the user device. At block 1620, the comment and selected screen location are transmitted from the user input device to a data store of stored comments associated with the media content. At block 1625, the comment is associated with the screen location during the playback of the media content at the data store. At block 1630, the comment and associated screen location are transmitted from the data store to an output device configured to playback the media content. At block 1635, an indication of the comment is displayed at the associated screen location during the playback of the media content.

Figure 17:
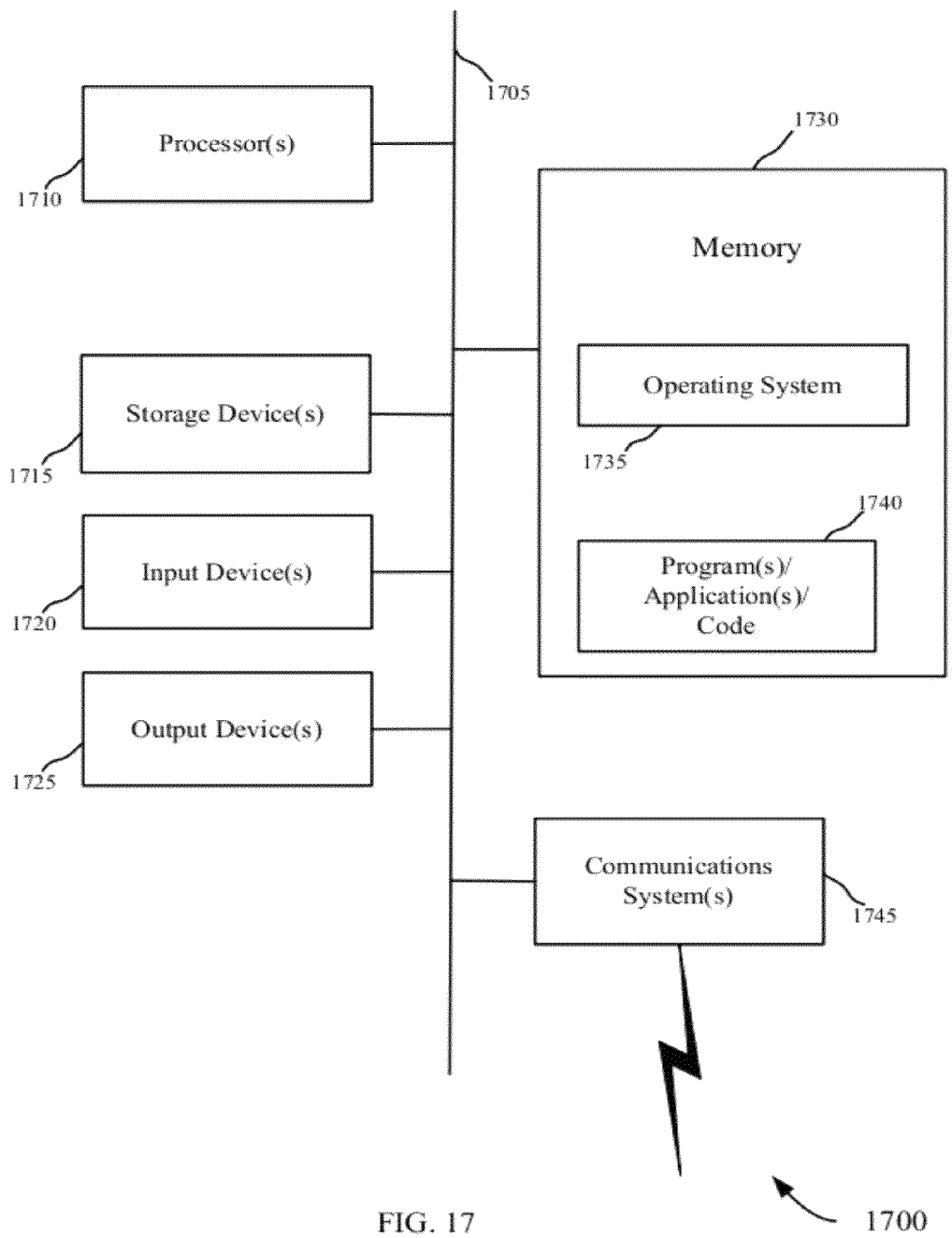
FIG. 17 is a schematic diagram that illustrates a representative device structure that may be used in various embodiments of the present invention.

A device structure 1700 that may be used for one or more input devices 105, the central server computer system 115, for one or more output devices 125, or for other computing devices described herein, is illustrated with the schematic diagram of FIG. 17. This drawing broadly illustrates how individual system elements of each of the aforementioned devices may be implemented, whether in a separated or more integrated manner. Thus, any or all of the various components of one of the aforementioned devices may be combined in a single unit or separately maintained and can further be distributed in multiple groupings or physical units or across multiple locations. The example structure shown is made up of hardware elements that are electrically coupled via bus 1705, including processor(s) 1710 (which may further comprise a DSP or special-purpose processor), storage device(s) 1715, input device(s) 1720, and output device(s) 1725. The storage device(s) 1715 may be a machine-readable storage media reader connected to any machine-readable storage medium, the combination comprehensively representing remote, local, fixed, or removable storage devices or storage media for temporarily or more permanently containing computer-readable information. The communications system(s) interface 1745 may interface to a wired, wireless, or other type of interfacing connection that permits data to be exchanged with other devices. The communications system(s) interface 1745 may permit data to be exchanged with a network.

The structure 1700 may also include additional software elements, shown as being currently located within working memory 1730, including an operating system 1735 and other code 1740, such as programs or applications designed to implement methods of the invention. It will be apparent to those skilled in the art that substantial variations may be used in accordance with specific requirements. For example, customized hardware might also be used, or particular elements might be implemented in hardware, software (including portable software, such as applets), or both.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices or other computer-readable mediums for storing information. The term "computer-readable medium" includes, but is not limited to, portable or fixed storage devices, optical storage devices, wireless channels, a sim card, other smart cards, and various other mediums capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method of associating comments with playback of media content on a screen of an output device, the method comprising:
   synchronizing a playback timing tracked by an input device with the playback of the media content on the output device, wherein the input device and the output device comprise separate processors;
   receiving from a user at the input device a selection of a screen location during the playback of the media content on the output device;
   identifying an image feature displayed on the screen of the output device based on the selected screen location and the playback timing tracked by the input device; and
   receiving from the user at the input device a comment associated with the media content;
   associating the comment with a position of the identified image feature on the screen of the output device.

2. The method of claim 1, further comprising:
transmitting the identified image feature and the comment to a data store of stored comments associated with the media content.

3. The method of claim 1, further comprising:
receiving from the user a selection of a point during the playback of the media content for insertion of the comment; and
associating the identified image feature and the comment with the selected point during the playback of the media content.

4. The method of claim 1, further comprising:
providing a graphical indication to the user that the image feature has been associated with the comment.

5. The method of claim 1, further comprising:
causing an indication of the comment is to be displayed on the output device.

6. The method of claim 1, wherein the input device comprises one of the group consisting of: a mobile device, a mobile phone, a laptop, a tablet, or a computer.

7. The method of claim 1, further comprising:
uploading the comment and an indication of the identified image feature to a network service in communication with both the input device and the output device.

8. An input device apparatus for associating comments with playback of media content on a screen of an output device, the apparatus comprising:
at least one processor, wherein the at least one processor is separate from a processor of the output device;
a memory communicatively coupled with the at least one processor, the memory comprising computer-readable program code stored thereon; wherein the at least one processor, upon executing the computer-readable program code, is configured to:
synchronize a playback timing tracked by the input device apparatus with the playback of the media content on the output device;
receive from a user a selection of a screen location during the playback of the media content on the output device;
identify an image feature displayed on the screen of the output device based on the selected screen location and the playback timing tracked by the input device;
receive from the user a comment associated with the media content; and
associate the comment with a position of the identified image feature on the screen.

9. The apparatus of claim 8, wherein the at least one processor is further configured to:
transmit the identified image feature and the comment to a data store of stored comments associated with the media content.

10. The apparatus of claim 8, wherein
the at least one processor is further configured to:
receive from the user a selection of a point during the playback of the media content for insertion of the comment; and
associate the identified image feature and the comment with the selected point during the playback of the media content.

11. The apparatus of claim 8, wherein the at least one processor is further configured to:
provide a graphical indication to the user that the image feature has been associated with the comment.

12. A method of associating comments with playback of media content on a screen of an output device, the method comprising:
receiving a selection of a screen location associated with the playback of the media content from an input device, wherein a playback timing tracked by the input device is synchronized with the playback of the media content on the output device, and wherein the input device and the output device comprise separate processors;
receiving, from the input device, an identification of an image feature displayed on the screen of the output device near the selected screen location, wherein the identification of the image feature is based on the selected screen location and the playback timing tracked by the input device;
receiving a comment associated with the identified image feature from the input device over a network;
associating the comment with a position of the identified image feature on the screen of the output device in a data store of stored comments associated with the media content; and
providing an indication of the comment at the position of the identified image feature, wherein the position of the identified image feature and the indication changes over time.

13. The method of claim 12, further comprising:
receiving a selection of a point during the playback of the media content for insertion of the comment over the network; and
associating the identified image feature and the comment with the selected point in time during the playback of the media content in the data store of stored comments associated with the media content.

14. The method of claim 12, further comprising:
receiving a request for comments associated with the media content from the output device; and
providing the comment and a representation of the identified image feature associated with the comment to the output device.

15. The method of claim 12, wherein the input device comprises one of the group consisting of: a mobile device, a mobile phone, a laptop, a tablet, or a computer.

16. A method of providing comments during playback of media content on a screen of an output device, the method comprising:
receiving, over a network, a comment generated at an input device associated with a position on the screen of an identified image feature in the media content from a data store of comments associated with the media content; wherein the input device and the output device comprise separate processors;
monitoring the playback of the media content to identify a point during the playback of the media content that is associated with the comment; and
displaying an indication at a position of the image feature that the comment is associated with the identified image feature at the point during the playback of the media content that is associated with the comment, wherein the position of the identified image feature and the indication changes over time;
wherein the identified image feature and the point during the playback of the media content are based on a playback timing tracked by the input device that is synchronized with the playback of the media content on the output device.

17. The method of claim 16, further comprising:
receiving the point during the playback of the media content that is associated with the comment from the data store.

18. The method of claim 16, wherein the monitoring the playback of the media content to identify the point that is associated with the comment comprises determining that the image feature is currently being displayed during the playback of the media content.

19. The method of claim 16, wherein the output device comprises one of the group consisting of: a mobile device, a mobile phone, a laptop, a tablet, a computer, or a television.

\* \* \* \* \*